United States Patent
Yu

(10) Patent No.: US 12,200,533 B2
(45) Date of Patent: Jan. 14, 2025

(54) METHOD AND APPARATUS FOR CONTROLLING SERVICE FLOW TRANSMISSION, AND SYSTEM

(71) Applicant: HUAWEI TECHNOLOGIES CO., LTD., Guangdong (CN)

(72) Inventor: Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/706,274

(22) Filed: Mar. 28, 2022

(65) Prior Publication Data

US 2022/0217569 A1 Jul. 7, 2022

Related U.S. Application Data

(63) Continuation of application No. PCT/CN2020/118897, filed on Sep. 29, 2020.

(30) Foreign Application Priority Data

Sep. 29, 2019 (CN) .......................... 201910937270.8
Dec. 31, 2019 (CN) .......................... 201911425198.7

(51) Int. Cl.
*H04W 28/02* (2009.01)
*H04W 28/10* (2009.01)
*H04W 28/24* (2009.01)

(52) U.S. Cl.
CPC ... *H04W 28/0257* (2013.01); *H04W 28/0268* (2013.01); *H04W 28/10* (2013.01); *H04W 28/24* (2013.01)

(58) Field of Classification Search
CPC ......... H04W 28/0257; H04W 28/0268; H04W 28/10; H04W 28/24; H04W 28/22; H04L 47/2425
See application file for complete search history.

(56) References Cited

U.S. PATENT DOCUMENTS 9,210,564 B2 * 12/2015 Yang ..................... H04W 8/18
10,841,835 B2 * 11/2020 Castro Castro ....... H04W 76/16
(Continued)

FOREIGN PATENT DOCUMENTS

| CN | 109392042 A | 2/2019 |
|---|---|---|
| CN | 109756938 A | 5/2019 |

(Continued)

OTHER PUBLICATIONS

Ericsson, "PDU Session Related Policy Information," 3GPP TSG SA2 Meeting #134, S2-1907056, Sapporo, Japan, Jun. 24-28, 2019, 3 pages.

(Continued)

*Primary Examiner* — Mounir Moutaouakil
(74) *Attorney, Agent, or Firm* — Fish & Richardson P.C.

(57) ABSTRACT

Embodiments of this application relate to a method for controlling service flow transmission. One example method includes: a session management network element obtains a first TMBR of a service flow transmitted in a session by using a first access technology and a guaranteed bandwidth of a first GBR service flow, where the TMBR indicates a TMBR of service flows transmitted in the session by using the first access technology. The session management network element sends first information to a data plane network element, where the first information is used by the data plane network element to determine one or more of the following information of the session: a first AMBR, a second AMBR corresponding to the first access technology, and a second TMBR. A second AMBR indicates an AMBR of a non-GBR service flow transmitted in the session by using the first access technology.

19 Claims, 17 Drawing Sheets

(56) References Cited

U.S. PATENT DOCUMENTS

| | | | | |
|---|---|---|---|---|
| 2013/0188527 A1* | 7/2013 | Yang | ..................... | H04W 28/22 |
| | | | | 370/259 |
| 2018/0249373 A1* | 8/2018 | Castro Castro | ....... | H04W 24/08 |
| 2019/0253916 A1 | 8/2019 | Mathison et al. | | |
| 2022/0418013 A1* | 12/2022 | Yu | ........................ | H04W 76/15 |

FOREIGN PATENT DOCUMENTS

| | | |
|---|---|---|
| CN | 110049517 A | 7/2019 |
| CN | 110167088 A | 8/2019 |
| WO | 2018141218 A1 | 8/2018 |

OTHER PUBLICATIONS

Huawei et al., "PDU Session Policy," 3GPP TSG-SA WG2 Meeting #134, S2-1907117, Sapporo, Japan, Jun. 24-28, 2019, 4 pages.

Ericsson et al., "Session-TMBR for PDU Session in W-5GAN," 3GPP TSG CT WG1 Meeting #116, C1-192013, Xi'an (P.R. of China), Apr. 8-12, 2019, 20 pages.

Huawei et al., "Clarification of Session-TMBR", 3GPP TSG-SA WG2 Meeting #135, S2-1909765, Split, Croatia, Oct. 14-18, 2019, 3 pages.

Huawei, "Session-TMBR Enforcement For Hybrid Access With 5G-RG," SA WG2 Meeting #133, S2-19005631, Reno, USA, Mar. 13-17, 2019, 3 pages.

Telstra, "Extension of the QoS Model for Wireline Access," SA WG2 Meeting #131, S2-1901895, Santa Cruz De Tenerife, Spain, Feb. 25-Mar. 1, 2019, 7 pages.

Office Action in Chinese Appln. No. 201911425198.7, dated Sep. 27, 2012, 29 pages (with English translation).

Extended European Search Report in European Appln No. 20869327.5, dated Sep. 30, 2022, 8 pages.

International Search Report and Written Opinion in International Appln. No. PCT/CN2020/118897, mailed on Dec. 31, 2020, 17 pages (with English translation).

* cited by examiner

METHOD AND APPARATUS FOR CONTROLLING SERVICE FLOW TRANSMISSION, AND SYSTEM

CROSS-REFERENCE TO RELATED APPLICATION

This application is a continuation of International Application No. PCT/CN2020/118897, filed on Sep. 29, 2020, which claims priority to Chinese Patent Application No. 201911425198.7, filed on Dec. 31, 2019, which claims priority to Chinese Patent Application No. 201910937270.8, filed on Sep. 29, 2019. The disclosure of the aforementioned applications are hereby incorporated by reference in their entireties.

TECHNICAL FIELD

Embodiments of this application relate to the field of communication technologies, and in particular, to a method and an apparatus for controlling service flow transmission, and a system.

BACKGROUND

To face a challenge from a wireless broadband technology and keep a leading advantage of a 3rd generation partnership project (3GPP) network, the 3GPP standard group formulates a next generation mobile communication network architecture (next generation system), which is referred to as a 5th generation (5G) network architecture. The 5G network architecture not only supports a terminal in accessing a 5G core network (CN) by using a radio technology (for example, long term evolution (LTE) or a 5G radio access network (RAN)) defined by the 3GPP standard group, but also supports the terminal in accessing a core network side by using a non-3GPP access technology via a non-3GPP interworking function (N3IWF) or a next generation packet data gateway (ngPDG).

Subsequently, in addition to wireless access, the 5G core network can also support fixed/wireline network access. For example, the 5GC supports access of a residential gateway (RG) by using a wireline network. In this scenario, when the residential gateway supports cellular access in addition to the fixed/wireline access, the residential gateway is a user terminal device having a hybrid access capability or a multi-access capability.

In a 5G network, there is a packet data unit (PDU) session used to provide a data transmission channel between a terminal and a data network (DN). Currently, in the PDU session, a guaranteed bit rate (GBR) service flow can be transmitted, and a non-GBR service flow also can be transmitted. Each session is corresponding to a first aggregate maximum bit rate (AMBR) and a first total maximum bit rate (TMBR). However, the TMBR causes a session management network element or a user plane network element to be unclear about how to control service flow transmission.

SUMMARY

Embodiments of this application provide a method and an apparatus for controlling service flow transmission, and a system, to implement, when a TMBR is defined for a session, a QoS parameter control requirement that meets a requirement of a first access technology.

To achieve the foregoing objective, the following technical solutions are used in this application.

According to a first aspect, an embodiment of this application provides a method for controlling service flow transmission, including: A session management network element obtains a first total maximum bit rate (TMBR) of a service flow transmitted in a session by using a first access technology and a guaranteed bandwidth of a first guaranteed bit rate (GBR) service flow, where the TMBR is used to indicate a maximum bandwidth value of all service flows transmitted in the session by using the first access technology. The session management network element sends first information to a data plane network element, where the first information is used by the data plane network element to determine any one or more of the following information: a first aggregate maximum bit rate (AMBR) of the session, a second AMBR corresponding to the first access technology in the session, the first TMBR, and a second TMBR, and the second AMBR is used to indicate a maximum aggregate bandwidth of a non-GBR service flow transmitted in the session by using the first access technology.

This embodiment of this application provides the method for controlling service flow transmission. In this method, the session management network element obtains the first TMBR of the service flow transmitted in the session by using the first access technology and the guaranteed bandwidth of the first GBR service flow, and sends the first information to the data plane network element, so that the data plane network element determines the first aggregate maximum bit rate (AMBR) of the session, the second AMBR corresponding to the first access technology in the session, the first TMBR, and the second TMBR. Subsequently, the data plane network element may control, based on the at least one of the second AMBR, the first TMBR, and the second TMBR, the service flow transmitted in the session by using the first access technology, so that a QoS parameter control requirement required by the first access technology can be met.

In a possible implementation, the first information includes any one or more of the following information: the first aggregate maximum bit rate (AMBR), the second AMBR, and the second TMBR. In this case, the session management network element may calculate one or both of the second AMBR and the second TMBR, and a calculation step performed by the data plane network element is omitted. That is, the data plane network element may directly use one or both of the second AMBR and the second TMBR to control the service flow in the session.

In a possible implementation, the first information further includes one or both of a first access technology indication and a tunnel identifier corresponding to the first access technology. In this case, the data plane network element determines that one or both of the second AMBR and the second TMBR is or are related to the first access technology or related to a tunnel corresponding to the first access technology.

In a possible implementation, the method provided in this embodiment of this application further includes: The session management network element determines at least one of the second AMBR and the second TMBR based on the first TMBR and the guaranteed bandwidth of the first GBR service flow.

In a possible implementation, that the session management network element determines the second AMBR based on the first TMBR and the guaranteed bandwidth of the first GBR service flow includes: The session management network element determines, based on the guaranteed bandwidth of the first GBR service flow, a total guaranteed bandwidth of one or more GBR service flows transmitted in the session by using the first access technology. The session management network element determines the second AMBR based on the first TMBR and the total guaranteed bandwidth of the one or more GBR service flows. The first TMBR is used to describe the maximum bandwidth value of all the service flows transmitted in the session by using the first access technology. Therefore, the total guaranteed bandwidth of the one or more GBR service flows transmitted in the session by using the first access technology is calculated, so that the second AMBR may be obtained through calculation based on the first TMBR and the total guaranteed bandwidth of the one or more GBR service flows.

In a possible implementation, that the session management network element determines the second AMBR based on the first TMBR and the total guaranteed bandwidth of the one or more GBR service flows includes: The session management network element determines that the second AMBR is a difference between the first TMBR and the total guaranteed bandwidth of the one or more GBR service flows. That is, the session management network element directly uses the difference between the first TMBR and the total guaranteed bandwidth of the one or more GBR service flows as the second AMBR.

In a possible implementation, the method provided in this embodiment of this application further includes: The session management network element obtains the first AMBR corresponding to the session, where the first AMBR is used to indicate a maximum aggregate bandwidth of all non-GBR service flows in the session. Correspondingly, that the session management network element determines the second AMBR based on the first TMBR and the total guaranteed bandwidth of the one or more GBR service flows includes: When the difference between the first TMBR and the total guaranteed bandwidth of the one or more GBR service flows is greater than the first AMBR, the session management network element determines that the second AMBR is the first AMBR. Alternatively, when the difference between the first TMBR and the total guaranteed bandwidth of the one or more GBR service flows is less than or equal to the first AMBR, the session management network element determines that the second AMBR is the difference between the first TMBR and the total guaranteed bandwidth of the one or more GBR service flows. That is, the session management network element compares the first AMBR with (the difference between the first TMBR and the total guaranteed bandwidth of the one or more GBR service flows), and determines a smallest value as the second AMBR.

In a possible implementation, that the session management network element determines the second TMBR based on the first TMBR and the guaranteed bandwidth of the first GBR service flow includes: The session management network element determines the second TMBR based on the first TMBR and the total guaranteed bandwidth of the one or more GBR service flows split on an uplink classifier corresponding to the first access technology. In this way, the second TMBR can be accurately calculated. For example, the second TMBR is a difference obtained by subtracting, from the first TMBR, the total guaranteed bandwidth of the one or more GBR service flows split on the uplink classifier corresponding to the first access technology.

In a possible implementation, the method provided in this embodiment of this application further includes: The session management network element sends, to an access network gateway corresponding to the first access technology, an identifier of the session and any one or more of the following information: the second AMBR and the first TMBR. In this way, the access network gateway corresponding to the first access technology controls, based on the second AMBR and the first TMBR, the service flow transmitted in the session by using the first access technology.

In a possible implementation, the method provided in this embodiment of this application further includes: The session management network element sends the second AMBR or the first TMBR of the session to the uplink classifier corresponding to the first access technology. In this way, the uplink classifier corresponding to the first access technology determines a parameter for controlling the service flow.

In a possible implementation, the data plane network element in this embodiment of this application is a terminal, or the data plane network element in this embodiment of this application is a user plane network element.

In a possible implementation, the session provided in this embodiment of this application is a multi-access session that supports the first access technology and a second access technology. Alternatively, the session is a single access session that supports the first access technology.

In a possible implementation, the first information includes any one or more of the following information: the first TMBR, the second TMBR, or a guaranteed bandwidth of each GBR service flow in one or more GBR service flows transmitted in the session by using the first access technology.

It should be understood that the session management network element in the first aspect may be replaced with a policy control network element. When the session management network element is replaced with the policy control network element, the policy control network element calculates at least one of the second AMBR and the second TMBR. The policy control network element may send the first information to the data plane network element by using the session management network element, and send a related parameter to another node (for example, the access network gateway or an access network device).

In a possible implementation, the method provided in this embodiment of this application further includes: The session management network element sends indication information to the data plane network element, where the indication information indicates that when the GBR service flow transmitted in the session by using the first access technology is in an inactive mode, a guaranteed bandwidth resource of the GBR service flow may be used by the non-GBR service flow transmitted by using the first access technology. Specifically, the second AMBR of the non-GBR service flow transmitted in the session by using the first access technology is a sum of a target second AMBR allocated to the non-GBR service flow and a guaranteed bandwidth value of the GBR service flow in the inactive mode, or the second AMBR is the first AMBR. In this case, when no GBR service flow is transmitted in the session, the non-GBR service flow makes full use of bandwidth resources of the session, to ensure reliable transmission of the non-GBR service flow. The target second AMBR is the second AMBR calculated by the session management network element for the non-GBR service flow, and is sent by the session management gateway to the data plane network element.

In a possible implementation, when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode. Alternatively, when the sum of the target second AMBR and the guaranteed bandwidth value of the GBR service flow in the inactive mode is greater than or equal to the first AMBR, the second AMBR is the first AMBR. This may ensure that a maximum bandwidth of the session is not exceeded when the bandwidth resources of the session are fully used.

In a possible implementation, the indication information is any one or more of the second AMBR, a dynamic resource adjustment indication, the first access technology indication, or the tunnel identifier corresponding to the first access technology.

According to a second aspect, an embodiment of this application provides a method for controlling service flow transmission, including: A data plane network element receives first information from a session management network element. The first information is used by the data plane network element to determine any one or more of the following information: a first aggregate maximum bit rate (AMBR) of a session, a second aggregate maximum bit rate (AMBR) corresponding to a first access technology in the session, a first TMBR, and a second TMBR. The second AMBR is used to indicate a maximum aggregate bandwidth of a non-guaranteed bit rate (GBR) service flow transmitted in the session by using the first access technology, and the TMBR is used to indicate a maximum bandwidth value of all service flows transmitted in the session by using the first access technology. The data plane network element controls, based on at least one of the second AMBR, the first TMBR, and the second TMBR, the service flow transmitted in the session by using the first access technology.

In a possible implementation, the first information includes any one or more of the following information: the first aggregate maximum bit rate (AMBR), the second AMBR, and the second TMBR.

In a possible implementation, the first information further includes one or both of a first access technology indication and a tunnel identifier corresponding to the first access technology.

In a possible implementation, the second AMBR is a difference between the first TMBR and a total guaranteed bandwidth of one or more GBR service flows transmitted in the session by using the first access technology. Alternatively, when a difference between the first TMBR and a total guaranteed bandwidth of one or more GBR service flows transmitted in the session by using the first access technology is greater than the first AMBR, the second AMBR is the first AMBR. The second TMBR is a difference between the first TMBR and the total guaranteed bandwidth of the one or more GBR service flows split on an uplink classifier corresponding to the first access technology. Alternatively, when a difference between the first TMBR and a total guaranteed bandwidth of one or more GBR service flows transmitted in the session by using the first access technology is less than the first AMBR, the second AMBR is the difference between the first TMBR and the total guaranteed bandwidth of the one or more GBR service flows transmitted in the session by using the first access technology.

In a possible implementation, that the data plane network element controls, based on at least one of the second AMBR and the second TMBR, the service flow transmitted in the session by using the first access technology includes: The data plane network element controls, based on the second AMBR, all non-GBR service flows transmitted in the session by using the first access technology; and/or the data plane network element controls a total bandwidth of all the non-GBR service flows and all GBR service flows that are transmitted in the session by using the first access technology to be less than or equal to the second TMBR.

In a possible implementation, the method provided in this embodiment of this application further includes: The data plane network element obtains the first AMBR. That the data plane network element controls, based on the second AMBR, all non-GBR service flows transmitted in the session by using the first access technology includes: The data plane network element controls a total aggregate bandwidth of the non-GBR service flows transmitted in the session by using the first access technology or a tunnel corresponding to the first access technology to be less than or equal to the second AMBR; and/or a total aggregate bandwidth of all the non-GBR service flows transmitted in the session by using the first access technology and all non-GBR service flows transmitted in the session by using a second access technology to be less than or equal to the first AMBR.

In a possible implementation, the first information includes any one or more of the following information: the first TMBR, the second TMBR, or a guaranteed bandwidth of each GBR service flow in one or more GBR service flows transmitted in the session by using the first access technology. The method provided in this embodiment of this application further includes: The data plane network element determines the second AMBR based on the first TMBR or the second TMBR and the guaranteed bandwidth of each GBR service flow in the one or more GBR service flows.

In a possible implementation, that the data plane network element determines the second AMBR based on the first TMBR or the second TMBR and the guaranteed bandwidth of each GBR service flow in the one or more GBR service flows includes: The data plane network element determines a total guaranteed bandwidth of the one or more GBR service flows based on the guaranteed bandwidth of each GBR service flow. The data plane network element determines the second AMBR as a first difference, where the first difference is a difference between the first TMBR or the second TMBR and the total guaranteed bandwidth of the one or more GBR service flows.

In a possible implementation, that the data plane network element determines the second AMBR based on the first TMBR or the second TMBR and the guaranteed bandwidth of each GBR service flow in the one or more GBR service flows includes: The data plane network element determines a total guaranteed bandwidth of the one or more GBR service flows based on the guaranteed bandwidth of each GBR service flow. When the first difference is greater than the first AMBR, the data plane network element determines that the second AMBR is the first AMBR.

In a possible implementation, that the data plane network element determines the second AMBR based on the first TMBR or the second TMBR and the guaranteed bandwidth of each GBR service flow in the one or more GBR service flows includes: The data plane network element determines a total guaranteed bandwidth of the one or more GBR service flows based on the guaranteed bandwidth of each GBR service flow. The data plane network element determines that the second AMBR is any value less than the first difference. The first difference is a difference between the first TMBR or the second TMBR and the total guaranteed bandwidth of the one or more GBR service flows.

In a possible implementation, that the data plane network element determines the second AMBR based on the first TMBR or the second TMBR and the guaranteed bandwidth of each GBR service flow in the one or more GBR service flows includes: The data plane network element determines a total guaranteed bandwidth of the one or more GBR service flows based on the guaranteed bandwidth of each GBR service flow. When the first difference is less than the first AMBR, the data plane network element determines that the second AMBR is the first difference. The first difference is a difference between the first TMBR or the second TMBR and the total guaranteed bandwidth of the one or more GBR service flows.

In a possible implementation, that the data plane network element controls, based on the second AMBR, a service flow transmitted in the session by using the first access technology includes: The data plane network element controls a total aggregate bandwidth of all the non-GBR service flows transmitted in the session by using the first access technology to be less than or equal to the second AMBR.

In a possible implementation, the method provided in this embodiment of this application further includes: The data plane network element sends the second AMBR to an access network gateway or uplink classifier corresponding to the first access technology.

In a possible implementation, that the data plane network element controls, based on the first TMBR or the second TMBR, a service flow transmitted in the session by using the first access technology includes: The data plane network element controls a total aggregate bandwidth of all the GBR service flows and all the non-GBR service flows that are transmitted in the session by using the first access technology to be less than or equal to the first TMBR or the second TMBR.

In a possible implementation, the method provided in this embodiment of this application further includes: The data plane network element receives indication information from the session management network element, where the indication information indicates that when the GBR service flow transmitted in the session by using the first access technology is in an inactive mode, the second AMBR of the non-GBR service flow transmitted in the session by using the first access technology is a sum of a target second AMBR allocated to the non-GBR service flow and a guaranteed bandwidth value of the GBR service flow in the inactive mode, or the second AMBR is the first AMBR. The data plane network element determines, based on the indication information, that the second AMBR is the sum of the target second AMBR allocated to the non-GBR service flow and the guaranteed bandwidth value of the GBR service flow in the inactive mode, or that the second AMBR is the first AMBR.

In a possible implementation, when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode.

Alternatively, when the sum of the target second AMBR and the guaranteed bandwidth value of the GBR service flow in the inactive mode is greater than or equal to the first AMBR, the second AMBR is the first AMBR.

According to a third aspect, this application provides an apparatus for controlling service flow transmission. The apparatus for controlling service flow transmission may implement the method in any one of the first aspect or the possible implementations of the first aspect, and therefore can achieve the beneficial effects in any one of the first aspect or the possible implementations of the first aspect. The apparatus for controlling service flow transmission may be a session management network element, or may be an apparatus that can support the session management network element in implementing the method in any one of the first aspect or the possible implementations of the first aspect, for example, a chip used in the session management network element. The apparatus for controlling service flow transmission may implement the foregoing method by using software, hardware, or hardware executing corresponding software.

In an example, the apparatus for controlling service flow transmission provided in this application includes a processing unit, configured to process information; and a communication unit, configured to obtain a first total maximum bit rate (TMBR) of a service flow transmitted in a session by using a first access technology and a guaranteed bandwidth of a first guaranteed bit rate (GBR) service flow, where the TMBR is used to indicate a maximum bandwidth value of all service flows transmitted in the session by using the first access technology, where the communication unit is further configured to send first information to a data plane network element, where the first information is used by the data plane network element to determine any one or more of the following information: a first aggregate maximum bit rate (AMBR) of the session, a second AMBR corresponding to the first access technology in the session, the first TMBR, and a second TMBR, and the second AMBR is used to indicate a maximum aggregate bandwidth of a non-GBR service flow transmitted in the session by using the first access technology.

In a possible implementation, the first information includes any one or more of the following information: the first aggregate maximum bit rate (AMBR), the second AMBR, and the second TMBR.

In a possible implementation, the processing unit is further configured to determine at least one of the second AMBR and the second TMBR based on the first TMBR and the guaranteed bandwidth of the first GBR service flow.

In a possible implementation, the processing unit is specifically configured to determine, based on the guaranteed bandwidth of the first GBR service flow, a total guaranteed bandwidth of one or more GBR service flows transmitted in the session by using the first access technology; and the processing unit is specifically configured to determine the second AMBR based on the first TMBR and the total guaranteed bandwidth of the one or more GBR service flows.

In a possible implementation, the communication unit is further configured to obtain the first AMBR corresponding to the session, where the first AMBR is used to indicate a maximum aggregate bandwidth of all non-GBR service flows in the session; and the processing unit is specifically configured to determine that the second AMBR is a difference between the first TMBR and the total guaranteed bandwidth of the one or more GBR service flows. Alternatively, if a difference between the first TMBR and the total guaranteed bandwidth of the one or more GBR service flows is greater than the first AMBR, the processing unit is specifically configured to determine that the second AMBR is the first AMBR.

In a possible implementation, the processing unit is specifically configured to determine the second TMBR based on the first TMBR and the total guaranteed bandwidth of the one or more GBR service flows split on an uplink classifier corresponding to the first access technology.

In a possible implementation, the communication unit is further configured to send, to an access network gateway corresponding to the first access technology, an identifier of the session and any one or more of the following information: the second AMBR and the first TMBR.

In a possible implementation, the communication unit is further configured to send the second AMBR or the first TMBR of the session to the uplink classifier corresponding to the first access technology.

In a possible implementation, the first information includes any one or more of the following information: the first TMBR, the second TMBR, or a guaranteed bandwidth of each GBR service flow in one or more GBR service flows transmitted in the session by using the first access technology.

In a possible implementation, the communication unit is further configured to send indication information to the data plane network element, where the indication information indicates that when the GBR service flow transmitted in the session by using the first access technology is in an inactive mode, the second AMBR of the non-GBR service flow transmitted in the session by using the first access technology is a sum of a target second AMBR allocated to the non-GBR service flow and a guaranteed bandwidth value of the GBR service flow in the inactive mode, or the second AMBR is the first AMBR.

In a possible implementation, when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode. Alternatively, when the sum of the target second AMBR and the guaranteed bandwidth value of the GBR service flow in the inactive mode is greater than or equal to the first AMBR, the second AMBR is the first AMBR.

According to another aspect, an embodiment of this application provides an apparatus for controlling service flow transmission. The apparatus for controlling service flow transmission may be a session management network element, or may be a chip or a chip system in the session management network element. The apparatus for controlling service flow transmission may include a processing unit and a communication unit. When the apparatus for controlling service flow transmission is the session management network element, the processing unit may be a processor, and the communication unit may be a communication interface or an interface circuit. The apparatus for controlling service flow transmission may further include a storage unit, and the storage unit may be a memory. The storage unit is configured to store instructions, and the processing unit executes the instructions stored in the storage unit, so that the session management network element implements the method for controlling service flow transmission according to any one of the first aspect or the possible implementations of the first aspect. When the apparatus for controlling service flow transmission is the chip or the chip system in the session management network element, the processing unit may be a processor, and the communication unit may be a communication interface. For example, the communication interface may be an input/output interface, a pin, a circuit, or the like. The processing unit executes the instructions stored in the storage unit, so that the session management network element implements the method for controlling service flow transmission according to any one of the first aspect or the possible implementations of the first aspect. The storage unit may be a storage unit (for example, a register or a cache) in the chip, or may be a storage unit (for example, a read-only memory or a random access memory) that is in the session management network element and that is outside the chip.

According to a fourth aspect, this application provides an apparatus for controlling service flow transmission. The apparatus for controlling service flow transmission may implement the method in any one of the second aspect or the possible implementations of the second aspect, and therefore can achieve the beneficial effects in any one of the second aspect or the possible implementations of the second aspect. The apparatus for controlling service flow transmission may be a data plane network element, or may be an apparatus that can support the data plane network element in implementing the method in any one of the second aspect or the possible implementations of the second aspect, for example, a chip used in the data plane network element. The apparatus for controlling service flow transmission may implement the foregoing method by using software, hardware, or hardware executing corresponding software.

In an example, an embodiment of this application provides an apparatus for controlling service flow transmission, including: a communication unit, configured to receive first information from a session management network element, where the first information is used by a processing unit of the apparatus to determine any one or more of the following information: a first aggregate maximum bit rate (AMBR) of a session, a second aggregate maximum bit rate (AMBR) corresponding to a first access technology in the session, a first TMBR, and a second TMBR, the second AMBR is used to indicate a maximum aggregate bandwidth of a non-guaranteed bit rate (GBR) service flow transmitted in the session by using the first access technology, and the TMBR is used to indicate a maximum bandwidth value of all service flows transmitted in the session by using the first access technology, where the processing unit is configured to control, based on at least one of the second AMBR, the first TMBR, and the second TMBR, the service flow transmitted in the session by using the first access technology.

In a possible implementation, the first information includes any one or more of the following information: the first aggregate maximum bit rate (AMBR), the second AMBR, and the second TMBR.

In a possible implementation, the second AMBR is a difference between the first TMBR and a total guaranteed bandwidth of one or more GBR service flows transmitted in the session by using the first access technology; or when a difference between the first TMBR and a total guaranteed bandwidth of one or more GBR service flows transmitted in the session by using the first access technology is greater than the first AMBR, the second AMBR is the first AMBR; and the second TMBR is a difference between the first TMBR and the total guaranteed bandwidth of the one or more GBR service flows split on an uplink classifier corresponding to the first access technology.

In a possible implementation, that the processing unit is configured to control, based on at least one of the second AMBR and the second TMBR, the service flow transmitted in the session by using the first access technology includes: controlling, based on the second AMBR, all non-GBR service flows transmitted in the session by using the first access technology; and/or controlling a total bandwidth of all the non-GBR service flows and all GBR service flows that are transmitted in the session by using the first access technology to be less than or equal to the second TMBR.

In a possible implementation, the communication unit is further configured to obtain the first AMBR. The processing unit is specifically configured to control a total aggregate bandwidth of the non-GBR service flows transmitted in the session by using the first access technology or a tunnel corresponding to the first access technology to be less than or equal to the second AMBR; and/or a total aggregate bandwidth of all the non-GBR service flows transmitted in the session by using the first access technology and all non-GBR service flows transmitted in the session by using a second access technology to be less than or equal to the first AMBR.

In a possible implementation, the first information includes any one or more of the following information: the first TMBR, the second TMBR, or a guaranteed bandwidth of each GBR service flow in one or more GBR service flows transmitted in the session by using the first access technology. The processing unit is further configured to determine the second AMBR based on the first TMBR or the second TMBR and the guaranteed bandwidth of each GBR service flow in the one or more GBR service flows.

In a possible implementation, the processing unit is configured to determine a total guaranteed bandwidth of the one or more GBR service flows based on the guaranteed bandwidth of each GBR service flow; and the processing unit is configured to determine the second AMBR as a first difference, where the first difference is a difference between the first TMBR or the second TMBR and the total guaranteed bandwidth of the one or more GBR service flows. Alternatively, the first difference is greater than the first AMBR, and the processing unit is configured to determine that the second AMBR is the first AMBR; or the processing unit is configured to determine that the second AMBR is any value less than the first difference. Alternatively, the first difference is less than the first AMBR, and the processing unit is configured to determine the second AMBR as the first difference.

In a possible implementation, the processing unit is configured to control a total aggregate bandwidth of all the non-GBR service flows transmitted in the session by using the first access technology to be less than or equal to the second AMBR.

In a possible implementation, the communication unit is further configured to send the second AMBR to an access network gateway or uplink classifier corresponding to the first access technology.

In a possible implementation, that the processing unit is configured to control, based on the first TMBR or the second TMBR, a service flow transmitted in the session by using the first access technology includes: The processing unit is configured to control a total aggregate bandwidth of all the GBR service flows and all the non-GBR service flows that are transmitted in the session by using the first access technology to be less than or equal to the first TMBR or the second TMBR.

In a possible implementation, the communication unit is further configured to receive indication information from the session management network element, where the indication information indicates that when the GBR service flow transmitted in the session by using the first access technology is in an inactive mode, the second AMBR of the non-GBR service flow transmitted in the session by using the first access technology is a sum of a target second AMBR allocated to the non-GBR service flow and a guaranteed bandwidth value of the GBR service flow in the inactive mode, or the second AMBR is the first AMBR. The processing unit is further configured to determine, based on the indication information, that the second AMBR is the sum of the target second AMBR allocated to the non-GBR service flow and the guaranteed bandwidth value of the GBR service flow in the inactive mode, or that the second AMBR is the first AMBR.

In a possible implementation, when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode; or when the sum of the target second AMBR and the guaranteed bandwidth value of the GBR service flow in the inactive mode is greater than or equal to the first AMBR, the second AMBR is the first AMBR.

According to another aspect, an embodiment of this application provides an apparatus for controlling service flow transmission. The apparatus for controlling service flow transmission may be a data plane network element, or may be a chip or a chip system in the data plane network element. The apparatus for controlling service flow transmission may include a processing unit and a communication unit. When the apparatus for controlling service flow transmission is the data plane network element, the processing unit may be a processor, and the communication unit may be a communication interface or an interface circuit. The apparatus for controlling service flow transmission may further include a storage unit, and the storage unit may be a memory. The storage unit is configured to store instructions, and the processing unit executes the instructions stored in the storage unit, so that the data plane network element implements the method for controlling service flow transmission according to any one of the second aspect or the possible implementations of the second aspect. When the apparatus for controlling service flow transmission is the chip or the chip system in the data plane network element, the processing unit may be a processor, and the communication unit may be a communication interface. For example, the communication interface may be an input/output interface, a pin, a circuit, or the like. The processing unit executes the instructions stored in the storage unit, so that the data plane network element implements the method for controlling service flow transmission according to any one of the second aspect or the possible implementations of the second aspect. The storage unit may be a storage unit (for example, a register or a cache) in the chip, or may be a storage unit (for example, a read-only memory or a random access memory) that is in the data plane network element and that is outside the chip.

According to a fifth aspect, an embodiment of this application provides a computer-readable storage medium. The computer-readable storage medium stores a computer program or instructions. When the computer program or the instructions are run on a computer, the computer is enabled to perform the method for controlling service flow transmission according to any one of the first aspect or the possible implementations of the first aspect.

According to a sixth aspect, an embodiment of this application provides a computer-readable storage medium. The computer-readable storage medium stores a computer program or instructions. When the computer program or the instructions are run on a computer, the computer is enabled to perform the method for controlling service flow transmission according to any one of the second aspect or the possible implementations of the second aspect.

According to a seventh aspect, an embodiment of this application provides a computer program product including instructions. When the instructions are run on a computer, the computer is enabled to perform the method for controlling service flow transmission according to any one of the first aspect or the possible implementations of the first aspect.

According to an eighth aspect, this application provides a computer program product including instructions. When the instructions are run on a computer, the computer is enabled to perform the method for controlling service flow transmission according to any one of the second aspect or the possible implementations of the second aspect.

According to a ninth aspect, an embodiment of this application provides a communication system. The communication system includes the session management network element according to any one of the third aspect and the possible implementations thereof, and the data plane network element according to any one of the fourth aspect and the possible implementations of the fourth aspect.

In a possible implementation, the communication system may further include an access network gateway and uplink classifier corresponding to a first access technology, or an access network device corresponding to a second access technology and an uplink classifier corresponding to the second access technology.

According to a tenth aspect, an embodiment of this application provides a communication apparatus. The communication apparatus includes a processor and a storage medium. The storage medium stores instructions. When the instructions are run by the processor, to implement the method for controlling service flow transmission according to any one of the first aspect or the possible implementations of the first aspect.

According to an eleventh aspect, an embodiment of this application provides a communication apparatus. The communication apparatus includes a processor and a storage medium. The storage medium stores instructions. When the instructions are run by the processor, to implement the method for controlling service flow transmission according to any one of the second aspect or the possible implementations of the second aspect.

According to a twelfth aspect, an embodiment of this application provides a communication apparatus. The communication apparatus includes a processor, and the processor is coupled to a memory. The memory stores instructions. When the instructions are run by the processor, to implement the method for controlling service flow transmission according to any one of the first aspect or the possible implementations of the first aspect. That the processor is coupled to the memory may also be understood as that the memory is connected to the processor.

According to a thirteenth aspect, an embodiment of this application provides a communication apparatus. The communication apparatus includes a processor, and the processor is coupled to a memory. The memory stores instructions. When the instructions are run by the processor, to implement the method for controlling service flow transmission according to any one of the second aspect or the possible implementations of the second aspect.

It should be understood that the memory in the communication apparatus described in the twelfth aspect or the thirteenth aspect may be an internal memory of the communication apparatus, or may be an external memory. This is not limited in embodiments of this application.

According to a fourteenth aspect, this application provides a chip or a chip system. The chip or the chip system includes at least one processor and a communication interface. The communication interface and the at least one processor are interconnected by using a line. The at least one processor is configured to run a computer program or instructions, to perform the method for controlling service flow transmission according to any one of the first aspect or the possible implementations of the first aspect.

According to a fifteenth aspect, this application provides a chip or a chip system. The chip or the chip system includes at least one processor and a communication interface. The communication interface and the at least one processor are interconnected by using a line. The at least one processor is configured to run a computer program or instructions, to perform the method for controlling service flow transmission according to any one of the second aspect or the possible implementations of the second aspect.

The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

For beneficial effects of the second aspect to the fifteenth aspect and the implementations thereof in this application, refer to analysis of beneficial effects of the first aspect and the implementations thereof. Details are not described herein again.

DESCRIPTION OF EMBODIMENTS

Before embodiments of this application are described, related terms used in embodiments of this application are first explained.

Figure 2:
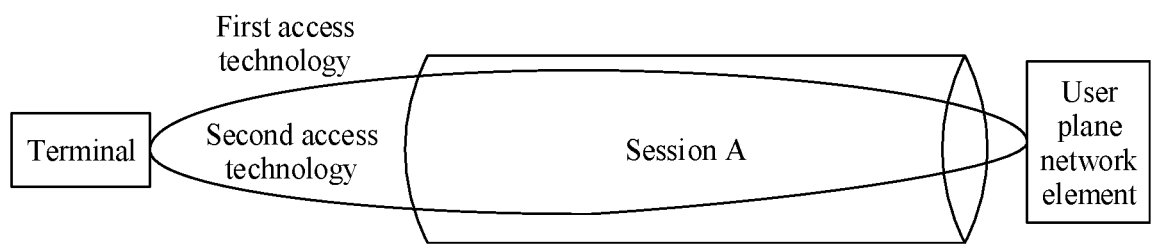
FIG. 2 is a schematic diagram of a multi-access session according to an embodiment of this application.

(1) As shown in FIG. 2, a session is a data transmission channel that is established by a session management network element, that connects a terminal to a user plane network element, and that reaches a data network.

(2) A multi-access session is a session that may support a plurality of access technologies. As shown in FIG. 2, a session A may be connected to a core network side by using a first access technology, or may be connected to the core network side by using a second access technology. For example, the session is a packet data unit (PDU) session, and the multi-access session is a multi-access PDU session (MA-PDU).

(3) A single access session is a session supporting one access technology. For example, a single access session in embodiments of this application means that the session supports the first access technology. That is, the session may access the core network side by using the first access technology.

(4) A terminal-aggregate maximum bit rate (AMBR) is a terminal granularity parameter, may also be referred to as a terminal AMBR (UE-AMBR), and is used to indicate a maximum aggregate bandwidth of all non-GBR (non-guaranteed bit rate) service flows of a terminal.

(5) A session-aggregate maximum bit rate (Session-AMBR) is a session granularity parameter, and is used to indicate a maximum aggregate bandwidth of all non-GBR service flows in a single session.

(6) A guaranteed bit rate (GBR) of a service flow is a service flow granularity parameter, is used to indicate a guaranteed bandwidth value that can be provided for a specific service flow by a network side of the specific service flow, namely, a minimum transmission bandwidth value, and is classified into an uplink guaranteed bandwidth value and a downlink guaranteed bandwidth value. This is applicable to a GBR service flow. When one or more GBR service flows are aggregated into one quality of service (QoS) flow, a guaranteed bandwidth value of the QoS flow is a sum of guaranteed bandwidth values of the GBR service flows, and is defined as a GFBR (Guaranteed Flow Bit Rate). Therefore, the GFBR is a QoS flow granularity parameter.

(7) A maximum bit rate (MBR) of a service flow is a service flow granularity parameter, and is used to indicate a maximum bandwidth value that can be provided for a specific service flow by a network side of the specific service flow, and is classified into an uplink maximum bandwidth value and a downlink maximum bandwidth value. This is applicable to a GBR service flow. When one or more GBR service flows are aggregated into one QoS flow, a maximum bandwidth value of the QoS flow is a sum of maximum bandwidth values of the GBR service flows, and is defined as an MFBR (Maximum Flow Bit Rate). Therefore, the MFBR is a QoS flow granularity parameter.

(8) A session-total maximum bit rate (session total maximum bit rate, Session-TMBR) is a session granularity parameter, and is used to indicate a total maximum bit rate of all service flows (for example, a GBR service flow and a non-GBR service flow) transmitted in a session by using the first access technology.

To clearly describe the technical solutions in embodiments of this application, terms such as "first" and "second" are used in embodiments of this application to distinguish between same items or similar items that provide basically same functions and purposes. For example, the first access technology and the second access technology are merely intended to distinguish between different access technologies, and do not limit a sequence of the first access technology and the second access technology. A person skilled in the art may understand that the terms such as "first" and "second" do not limit a quantity and an execution sequence, and the terms such as "first" and "second" do not indicate a definite difference.

It should be noted that in this application, the word such as "example" or "for example" is used to indicate giving an example, an illustration, or a description. Any embodiment or design solution described by using "example" or "for example" in this application shall not be construed as being more preferred or more advantageous than another embodiment or design solution. Exactly, use of the term such as "example" or "for example" is intended to present a related concept in a specific manner.

In this application, "at least one" means one or more, and "a plurality of" means two or more. The term "and/or" describes an association relationship between associated objects and indicates that three relationships may exist. For example, A and/or B may represent the following cases: Only A exists, both A and B exist, and only B exists, where A and B may be singular or plural. The character "/" usually indicates an "or" relationship between the associated objects. "At least one item (piece) of the following" or a similar expression thereof means any combination of these items, including a singular item (piece) or any combination of plural items (pieces). For example, at least one of a, b, or c may indicate: a; b; c; a and b; a and c; b and c; or a, b, and c; where a, b, and c may be singular or plural.

The technical solutions in embodiments of this application may be applied to various communication systems, such as a code division multiple access (CDMA) system, a time division multiple access (TDMA) system, a frequency division multiple access (FDMA) system, an orthogonal frequency division multiple access (orthogonal frequency-division multiple access, OFDMA) system, a single carrier frequency division multiple access (single carrier FDMA, SC-FDMA) system, and another system. Terms "system" and "network" may be interchanged with each other. A new version of the UMTS that uses E-UTRA is used in long term evolution (LTE) and various versions evolved based on LTE in 3GPP. A 5G communication system, a new radio (NR) system, and a non-3GPP access system, for example, a WLAN access network and a wireline access network, are next-generation communication systems that are under research. In addition, the communication systems may be further applied to a future-oriented communication technology, and are all applicable to the technical solutions provided in embodiments of this application.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

Figure 3A:
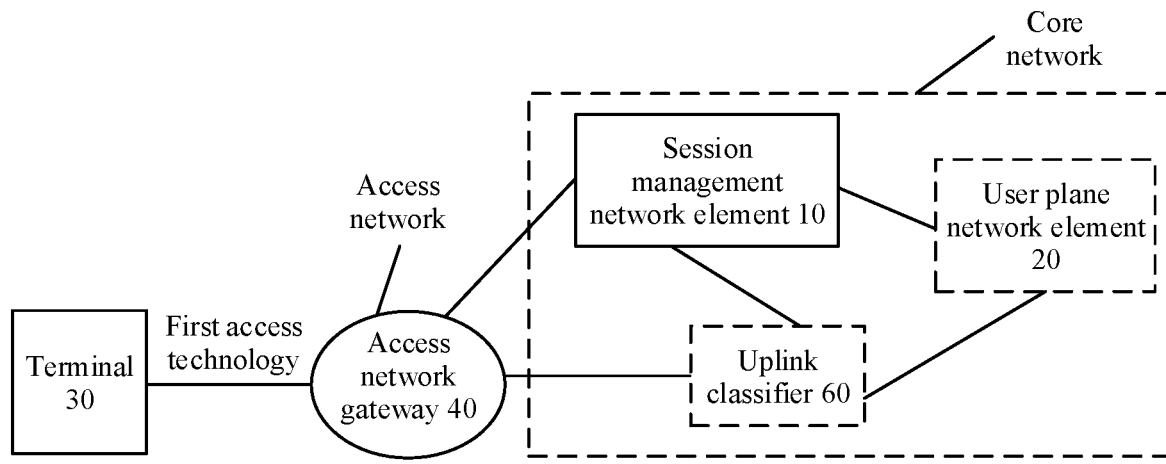
FIG. 3a is a schematic diagram of a structure of a communication system according to an embodiment of this application.

FIG. 3a shows a communication system used in a method for controlling service flow transmission according to an embodiment of this application. The communication system includes a session management network element 10 and a user plane network element 20 communicating with the session management network element 10.

In a possible implementation, the communication system in this embodiment of this application may further include one or more terminals 30, and the terminal 30 accesses a core network by using an access network. The session management network element 10 and the user plane network element 20 are both network elements in the core network. The access network includes an access network gateway 40 that supports a first access technology.

Either of the user plane network element 20 and the terminal 30 in this embodiment of this application may be used as a data plane network element.

In a possible implementation, the communication system may further include an uplink classifier (UL CL) 60. The uplink classifier 60 has a function of splitting a service flow transmitted in a session. Certainly, the uplink classifier may also be referred to as a branching point network element. The uplink classifier 60 communicates with the session management network element 10 and the user plane network element 20. The uplink classifier 60 may obtain a splitting rule, a second AMBR, and a first TMBR from the session management network element 10, and split the service flow according to the splitting rule. The uplink classifier 60 is further configured to control, based on a terminal AMBR or a terminal TMBR, a service flow transmitted by using the first access technology.

In FIG. 3a, in this embodiment of this application, there is at least one terminal that is in the one or more terminals 30 and that has a session with the user plane network element 20, and the session may be a single access session supporting the first access technology.

In this embodiment of this application, the terminal may have one or more sessions, and each session in the one or more sessions is corresponding to one first AMBR (Session-AMBR). Each terminal has one terminal AMBR (UE-AMBR). A non-GBR service flow needs to meet a first AMBR of a session in which the non-GBR service flow is located. The access network gateway may control all the sessions of the terminal.

Figure 3B:
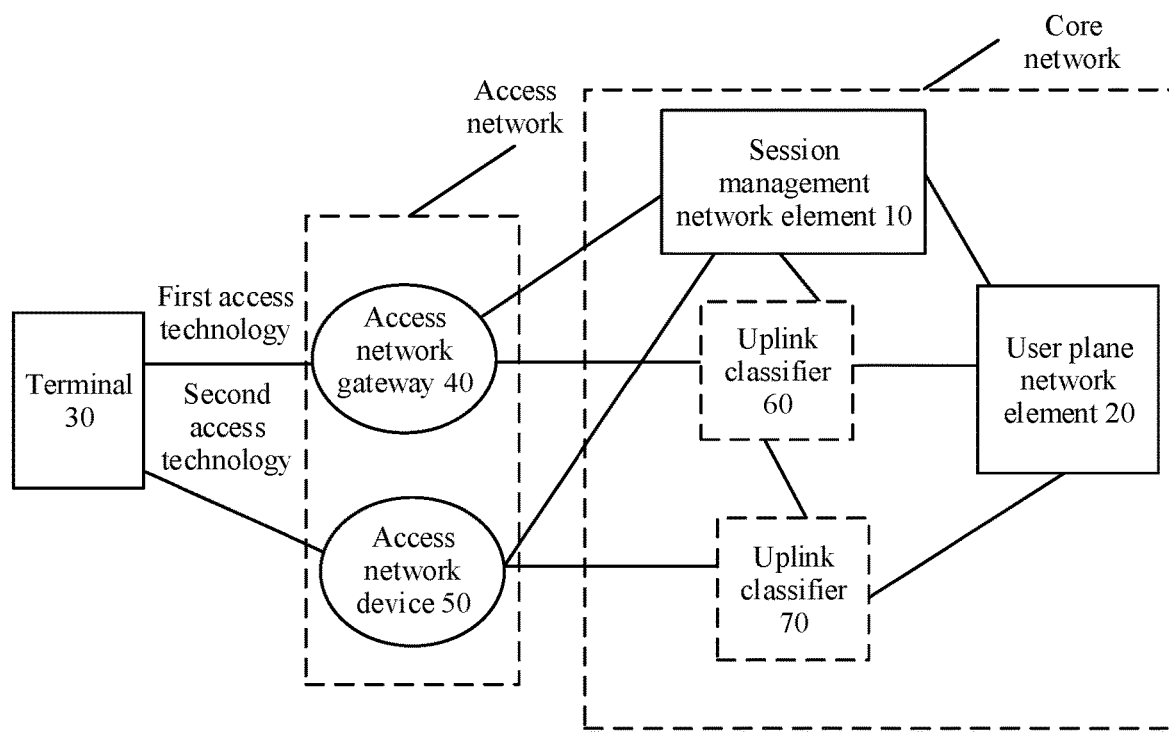
FIG. 3b is a schematic diagram of a structure of another communication system according to an embodiment of this application.

FIG. 3b shows a communication system used in a method for controlling service flow transmission according to an embodiment of this application. A difference between FIG. 3b and FIG. 3a lies in that a terminal 30 in FIG. 3b accesses a wireless network by using different access technologies. For example, the terminal 30 may communicate with a network element in a core network by using an access network gateway 40 supporting a first access technology and an access network device 50 supporting a second access technology.

In an optional implementation, the communication system shown in FIG. 3b may further include an uplink classifier 70 corresponding to the second access technology. The uplink classifier 70 is further configured to control, based on a first AMBR, a service flow transmitted by using the second access technology.

It should be understood that, in FIG. 3b, the uplink classifier 70 corresponding to the second access technology and the uplink classifier 60 corresponding to the first access technology may be a same uplink classifier. In this case, the uplink classifier may split a service flow transmitted by using the first access technology, and may also split a service flow corresponding to the second access technology.

In FIG. 3b, in this embodiment of this application, there is at least one terminal that is in one or more terminals 30 and that has a session with a user plane network element 20, and the session may be a multi-access session supporting the first access technology and the second access technology.

The second access technology in this embodiment of this application may be an access technology that complies with a 3GPP standard specification, for example, a 3rd generation partnership project (3GPP) access technology, or an access technology used in a long term evolution (LTE), 2G, 3G, 4G, or 5G system. An access network in which a 3GPP access technology is used is referred to as a radio access network (RAN). For example, the terminal 30 may use the 3GPP access technology to access a wireless network by using an access network device in the 2G, 3G, 4G, or 5G system.

The first access technology may be a radio access technology not defined in the 3GPP standard specification, and is referred to as, for example, a non-3rd generation partnership project (non 3rd generation partnership project, non-3GPP) access technology. The non-3GPP access technology may be an untrusted non-3GPP access technology, or may be a trusted non-3GPP access technology. The non-3GPP access technology may include: wireless fidelity (Wi-Fi), worldwide interoperability for microwave access (WiMAX), code division multiple access (CDMA), a wireless local area network (WLAN), a fixed network access technology, a wireline access technology (wireline access), or the like. The terminal 30 may access a network by using an air interface technology represented by Wi-Fi. An access network gateway corresponding to the first access technology may be a non-3GPP (Non-3GPP, N3G) access network gateway. For example, the non-3GPP access network gateway may include any one of the following: a non-3GPP interworking function (N3IWF) access network gateway/an untrusted WLAN access network gateway, a trusted non-3GPP gateway function (TNGF)/trusted non-3GPP access gateway, a fixed access gateway function/wireline access gateway function (W-AGF), and the like.

In this embodiment of this application, the terminals may be distributed in the wireless network, and each terminal may be static or mobile.

The session management network element 10 is responsible for establishing a corresponding session on a network side when a user initiates a service, providing a specific service for the terminal 30, and especially delivering a data packet forwarding policy, a QoS policy, and the like to the user plane network element 20 by using an interface between the session management network element 10 and the user plane network element 20.

The user plane network element 20 is a user plane gateway, and is mainly responsible for packet data packet forwarding, quality of service (QoS) control, charging information collection, and the like. For example, user plane data is transmitted to a data network by using the user plane network element 20. The data network is configured to serve the terminal 30, for example, provide a mobile operator service, an internet service, or a third-party service.

For example, the communication system shown in FIG. 3a or FIG. 3b is applied to a 4G core network. The session management network element 10 may be a mobility management entity (MME). The user plane network element 20 may be a packet data network gateway for user plane (PGW-User Plane, PGW-U) and a serving gateway for user plane (SGW-User Plane, SGW-U).

For example, the communication system shown in FIG. 3a or FIG. 3b is applied to a 5G network. In this case, as shown in FIG. 4a or FIG. 4b, a network element or an entity corresponding to the session management network element 10 may be a session management function (SMF) network element, and the user plane network element 20 is corresponding to a user plane function (UPF) network element in 5G.

Figure 4A:
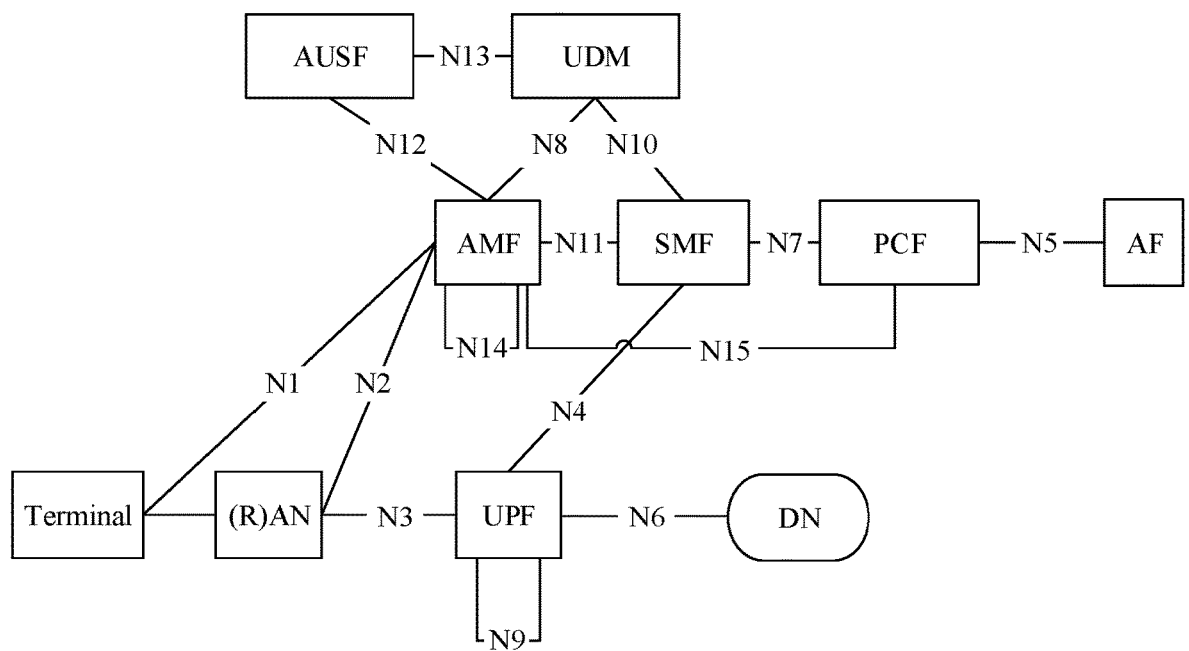
FIG. 4a is a schematic architectural diagram of a 5G network according to an embodiment of this application.
Figure 4B:
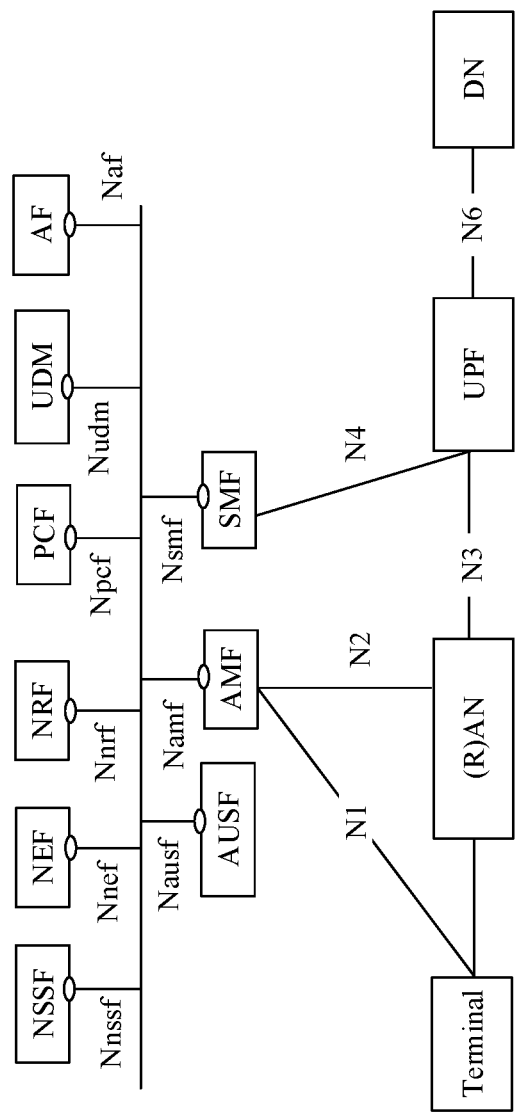
FIG. 4b is a schematic architectural diagram of another 5G network according to an embodiment of this application.

In addition, as shown in FIG. 4a or FIG. 4b, the 5G network may further include a policy control function (PCF) network element, an access and mobility management function (AMF) network element, an application function (AF) network element, an access network device (for example, an access network (AN)), which may also be referred to as a radio access network device (radio access network, RAN), an authentication server function (AUSF) network element, a unified data management (UDM) network element, a data network (DN), and the like. This is not specifically limited in this embodiment of this application.

The terminal communicates with the AMF network element through an N1 interface (N1 for short). The AMF network element communicates with the SMF network element through an N11 interface (N11 for short). The SMF network element communicates with one or more UPF network elements through an N4 interface (N4 for short). Any two of the one or more UPF network elements communicate with each other through an N9 interface (N9 for short). The UPF network element communicates with the DN through an N6 interface (N6 for short). The terminal accesses a network by using the access network device (for example, the RAN device). The access network device communicates with the AMF network element through an N2 interface (N2 for short). The SMF network element communicates with the PCF network element through an N7 interface (N7 for short), and the PCF network element communicates with the AF network element through an N5 interface. The access network device communicates with the UPF network element through an N3 interface (N3 for short). Any two or more AMF network elements communicate with each other through an N14 interface (N14 for short). The SMF network element communicates with the UDM network element through an N10 interface (N10 for short). The AMF network element communicates with the AUSF network element through an N12 interface (N12 for short). The AUSF network element communicates with the UDM network element through an N13 interface (N13 for short). The AMF network element communicates with the UDM network element through an N8 interface (N8 for short).

It should be noted that, names of the interfaces between the network elements in FIG. 4a or FIG. 4b are merely examples, and the interfaces may have other names in a specific implementation. This is not specifically limited in this embodiment of this application.

It should be noted that the access network device, the AF network element, the AMF network element, the SMF network element, the AUSF network element, the UDM network element, the UPF network element, the PCF network element, and the like in FIG. 4a or FIG. 4b are merely names, and the names do not constitute any limitation on the devices. In the 5G network and another future network, network elements corresponding to the access network device, the AF network element, the AMF network element, the SMF network element, the AUSF network element, the UDM network element, the UPF network element, and the PCF network element may have other names. This is not specifically limited in embodiments of this application. For example, the UDM network element may alternatively be replaced with a home subscriber server (HSS), a user subscription database (USD), a database entity, or the like. A general description is provided herein, and details are not described again below.

For example, the access network device in this embodiment of this application is a device accessing the core network, and may be, for example, a base station, a broadband network gateway (BNG), an aggregation switch, a non-3rd generation partnership project (3GPP) access network device, or a non-3GPP access gateway function. There may be base stations in various forms, for example, a macro base station, a micro base station (also referred to as a small cell), a relay station, and an access point.

For example, the AMF network element in this embodiment of this application may be further responsible for functions such as a registration procedure during access of the terminal, location management in a movement process of the terminal, and lawful interception. This is not specifically limited in this embodiment of this application.

For example, the SMF network element in this embodiment of this application is configured to perform session management, including session-related control functions such as session establishment, session modification, session release, internet protocol (IP) address allocation and management for networks of the terminal, UPF network element selection and control, and lawful interception.

For example, in addition to the function of the user plane function network element shown in FIG. 4a or FIG. 4b, the UPF network element in this embodiment of this application may further implement user plane functions of a serving gateway (SGW) and a packet data network gateway (PGW). In addition, the UPF network element may alternatively be a software defined network (SDN) switch. This is not specifically limited in this embodiment of this application.

The AUSF network element has an authentication server function, and is mainly responsible for performing authentication on the terminal, and determining validity of the terminal. For example, authentication is performed on the terminal based on user subscription data of the terminal.

The UDM network element is a unified user data manager, and is mainly configured to store subscription data of the terminal. In addition, the UDM network element further includes functions such as authentication, terminal identifier information processing, and subscription management. This is not specifically limited in embodiments of this application.

The PCF network element is mainly configured to deliver a service-related policy to the AMF network element or the SMF network element.

The AF network element sends an application-related requirement to the PCF network element, so that the PCF network element generates a corresponding policy.

The DN serves the terminal, for example, provides a mobile operator service, an internet service, or a third-party service.

The terminal is a device that provides voice and/or data connectivity for a user, for example, a handheld device or a vehicle-mounted device having a wireless connection function. The terminal may also be referred to as user equipment (UE), an access terminal, a user unit, a user station, a mobile station, a remote station, a remote terminal, a mobile device (Mobile Equipment), a user terminal, a wireless communication device (Wireless Telecom Equipment), a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal in a next generation communication system (for example, a 5th generation (Fifth-Generation, 5G) communication network), a terminal in a future evolved public land mobile network (PLMN), or the like. 5G may also be referred to as new radio (NR).

For example, in embodiments of this application, the terminal may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

Figure 5:
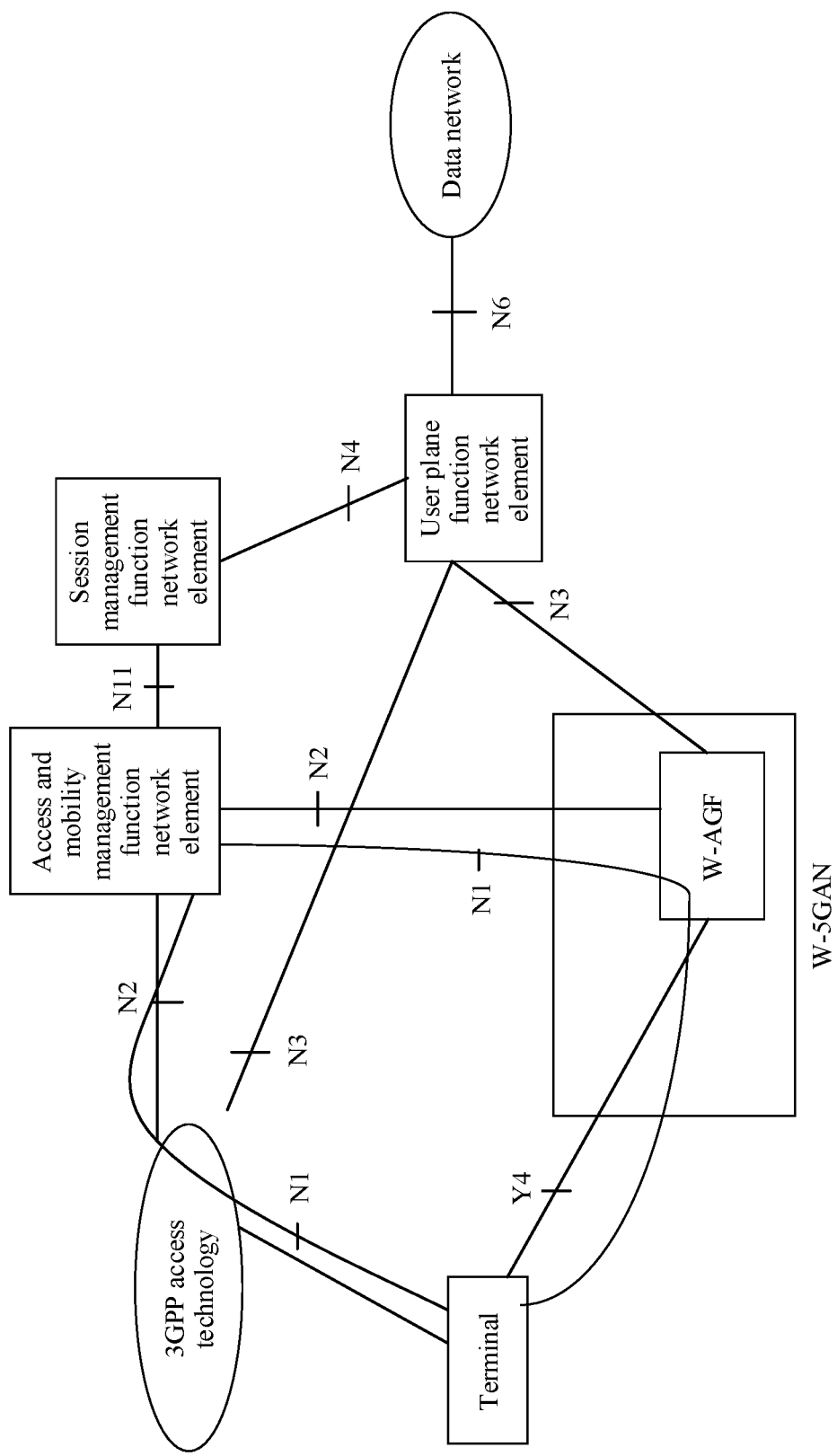
FIG. 5 is an architectural diagram of a multi-access technology according to an embodiment of this application.

FIG. 5 is a schematic diagram of an architecture in which a terminal accesses a network by using a plurality of access technologies according to an embodiment of this application, for example, an architecture in which the terminal uses a 3GPP access technology and a non-3GPP access technology. As shown in FIG. 5, the terminal may be connected to an access and mobility management function network element by using the 3GPP access technology and the non-3GPP access technology.

Specifically, as shown in FIG. 5, when accessing the access and mobility management function network element by using the non-3GPP access technology, the terminal may access the access and mobility management function network element by using a non-3GPP interworking function (N3IWF) entity. When the 3GPP and the non-3GPP belong to a same PLMN, the terminal selects a same access and mobility management function network element. When the 3GPP and the non-3GPP belong to different PLMNs, different access and mobility management function network elements may be selected.

A session management function network element is selected by the access and mobility management function network element. Different session management function network elements may be selected for different sessions, but a same session management function network element needs to be selected for a same session. The session management function network element may select a user plane function network element for a session. One session may include a plurality of user plane function network elements. Therefore, the session management function network element may select the plurality of user plane function network elements to create a tunnel connection for the session.

An AUSF network element and an authentication repository function (ARPF)/a UDM network element form a home public land mobile network (HPLMN). When accessing a network by using different access technologies, the terminal may have different visited public land mobile networks (VPLMNs), or may have a same visited public land mobile network. Specifically, for functions of the network elements shown in FIG. 5, refer to the foregoing embodiments. Details are not described herein again in this application.

Figure 6:
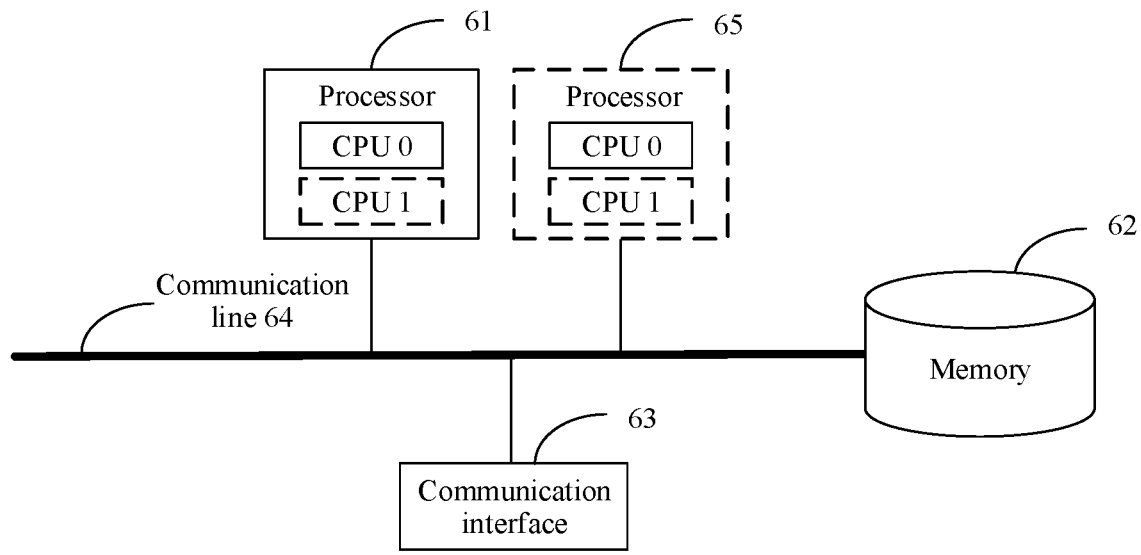
FIG. 6 is a schematic diagram of a structure of a communication device according to an embodiment of this application.

FIG. 6 is a schematic diagram of a hardware structure of a communication device according to an embodiment of this application. For hardware structures of the terminal 30, the session management network element 10, and the user plane network element 20 in embodiments of this application, refer to the structure shown in FIG. 6. The communication device may include a processor 61, a communication line 64, and at least one communication interface 63.

The processor 61 may be a general-purpose central processing unit (CPU), a microprocessor, an application-specific integrated circuit (ASIC), or one or more integrated circuits configured to control program execution of the solutions in this application.

The communication line 64 may include a path such as a bus for transmitting information between the foregoing components.

The communication interface 63, an apparatus using any transceiver, is configured to communicate with another device or a communication network such as the Ethernet, a RAN, or a WLAN.

Optionally, the communication device may further include a memory 62.

The memory 62 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor by using the communication line 64. Alternatively, the memory may be integrated with the processor.

The memory 62 is configured to store computer-executable instructions for executing the solutions in this application, and the execution is controlled by the processor 61. The processor 61 is configured to execute the computer-executable instructions stored in the memory 62, to implement a method for controlling service flow transmission provided in the following embodiments of this application.

Optionally, the computer-executable instructions in this embodiment of this application may also be referred to as application program code. This is not specifically limited in this embodiment of this application.

During specific implementation, in an embodiment, the processor 61 may include one or more CPUs, for example, a CPU 0 and a CPU 1 in FIG. 6.

During specific implementation, in an embodiment, the communication device may include a plurality of processors, for example, the processor 61 and a processor 65 in FIG. 6. Each of the processors may be a single-core (single-CPU) processor, or a multi-core (multi-CPU) processor. The processor herein may be one or more devices, circuits, and/or processing cores configured to process data (for example, computer program instructions).

It should be noted that mutual reference may be made between embodiments of this application. For example, for same or similar steps, mutual reference may be made between the method embodiment and the apparatus embodiment. This is not limited.

A GBR service flow in embodiments of this application may be transmitted by using one access technology, for example, transmitted by using a first access technology or a second access technology, or the GBR service flow may be transmitted by using a plurality of technologies simultaneously, for example, transmitted by using the first access technology and the second access technology. A non-GBR service flow may be transmitted by using one access technology, or may be transmitted by using a plurality of technologies simultaneously, for example, transmitted by using the first access technology and the second access technology. An example in which the GBR service flow is transmitted by using one access technology and the non-GBR service flow is transmitted by using a plurality of access technologies is used below.

Figure 1:
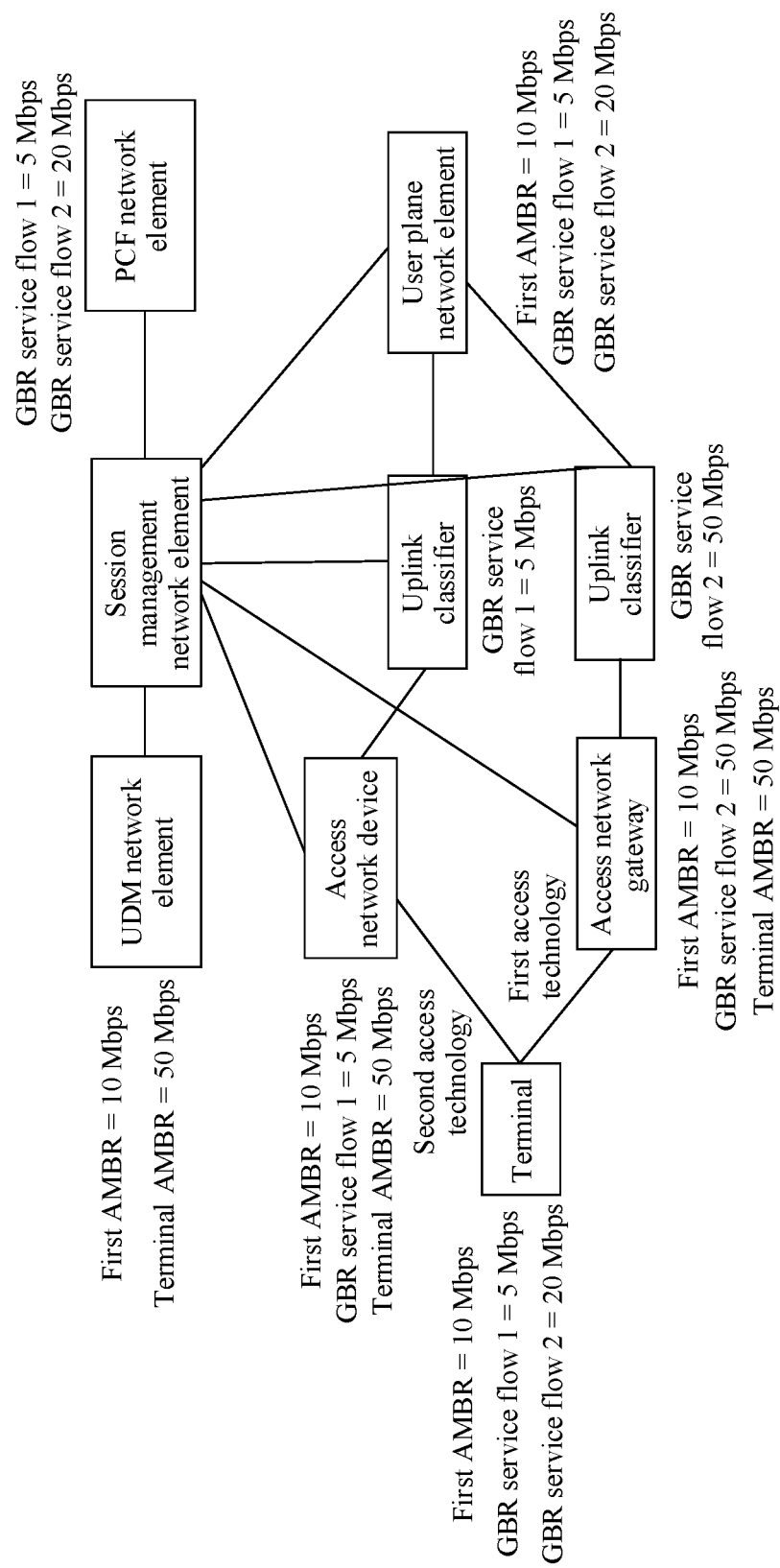
FIG. 1 is an architectural diagram of a control parameter at each node during service flow splitting according to an embodiment of this application.

As shown in FIG. 1, each PDU session is corresponding to one first AMBR of 10 Mbps, and each terminal has one terminal AMBR of 50 Mbps. A non-GBR service flow needs to meet the first AMBR of a session in which the non-GBR service flow is located. An access network device controls all sessions of the terminal. For example, a GBR service flow 1 of 5 Mbps and a GBR service flow 2 of 20 Mbps are transmitted in a session of the terminal, where the GBR service flow 1 is transmitted by using the second access technology, and the GBR service flow 2 is transmitted by using the first access technology. FIG. 1 shows how each node processes a QoS parameter. The terminal and a user plane network element mainly control an aggregate bandwidth of a non-GBR service flow based on the first AMBR, control a guaranteed bandwidth of the GBR service flow 1 based on the GBR service flow 1 of 5 Mbps, and control a guaranteed bandwidth of the GBR service flow 2 based on the GBR service flow 2 of 20 Mbps. The access network device calculates a current terminal AMBR value based on the first AMBR of each active session, to control the aggregate bandwidth of the non-GBR service flow of the terminal, and control the guaranteed bandwidth of the GBR service flow 1 based on the GBR service flow 1 of 5 Mbps.

When the session is a multi-access session, a same session service flow may be transmitted by using a plurality of access technologies simultaneously. Each processing node reserves a bandwidth resource for a GBR service flow based on a guaranteed bandwidth value. Therefore, an end-to-end bandwidth may be guaranteed for the GBR service flow. However, the non-GBR service flow can be transmitted by using a plurality of technologies simultaneously, and QoS control is performed based on an aggregate bandwidth value at a session granularity and a terminal granularity. Therefore, a sum of aggregate bandwidth values on an access side (the NG-RAN and the N3G gateway) is different from aggregate bandwidth values on two ends (the terminal and the user plane network element). For example, in FIG. 1, the first AMBRs on an access network device side and on an access network gateway are each 10 Mbps, and the sum is 20 Mbps. However, the first AMBR aggregate values of the session on the terminal and on the user plane network element are each only 10 Mpbs.

Second, when the first access technology is a wireline access technology, in addition to the foregoing QoS parameter, a QoS parameter dedicated to wireline access: session-TMBR (Session Total Maximum Bit Rate), is used to indicate a total maximum bit rate of all service flows (the GBR service flows and the non-GBR service flows) that are of a session and transmitted by using the wireline access technology. In an MA-PDU session, a GBR service flow may move on a first access technology side and a second access technology side, including switching of the entire GBR service flow to another access technology, or switching of a part of data of the GBR service flow to another access technology. In addition, the first TMBR is related to whether the GBR service flow currently occupies a part of bandwidth on the first access technology side. Consequently, QoS control on the first access technology side is difficult.

Based on this, an embodiment of this application provides a method for controlling service flow transmission. In this method, a session management network element obtains a first TMBR of a service flow transmitted in a session by using a first access technology and a guaranteed bandwidth of a first GBR service flow, and sends first information to a user plane network element, so that the user plane network element determines at least one of a second aggregate maximum bit rate (AMBR) and a second TMBR that are corresponding to the first access technology, and controls, based on at least one of the second AMBR and the second TMBR, the service flow transmitted in the session by using the first access technology. In this way, a QoS parameter control requirement required by the first access technology can be met.

In embodiments of this application, a specific structure of a body for performing a method for controlling service flow transmission is not specially limited in embodiments of this application, provided that the body can run a program recording code of the method for controlling service flow transmission in embodiments of this application to perform communication according to the method for controlling service flow transmission in embodiments of this application. For example, the method for controlling service flow transmission provided in embodiments of this application may be performed by a functional module that is in a session management network element and that can invoke and execute a program, or may be performed by a communication apparatus, for example, a chip, used in the session management network element. The method for controlling service flow transmission provided in embodiments of this application may be performed by a functional module that is in a user plane network element and that can invoke and execute a program, or may be a communication apparatus, for example, a chip, used in the user plane network element. This is not limited in this application. The following embodiment is described by using an example in which a method for controlling service flow transmission is performed by a user plane network element and a session management network element.

Figure 7:
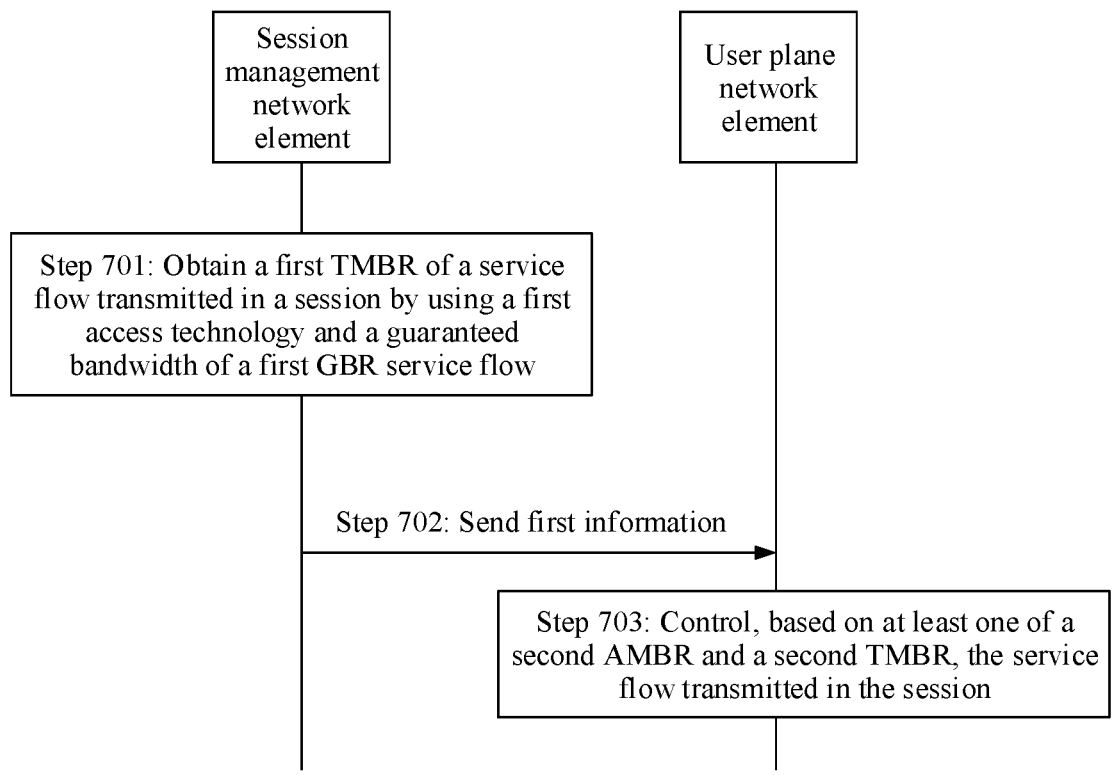
FIG. 7 is a schematic flowchart 1 of a method for controlling service flow transmission according to an embodiment of this application.
Figure 8A:
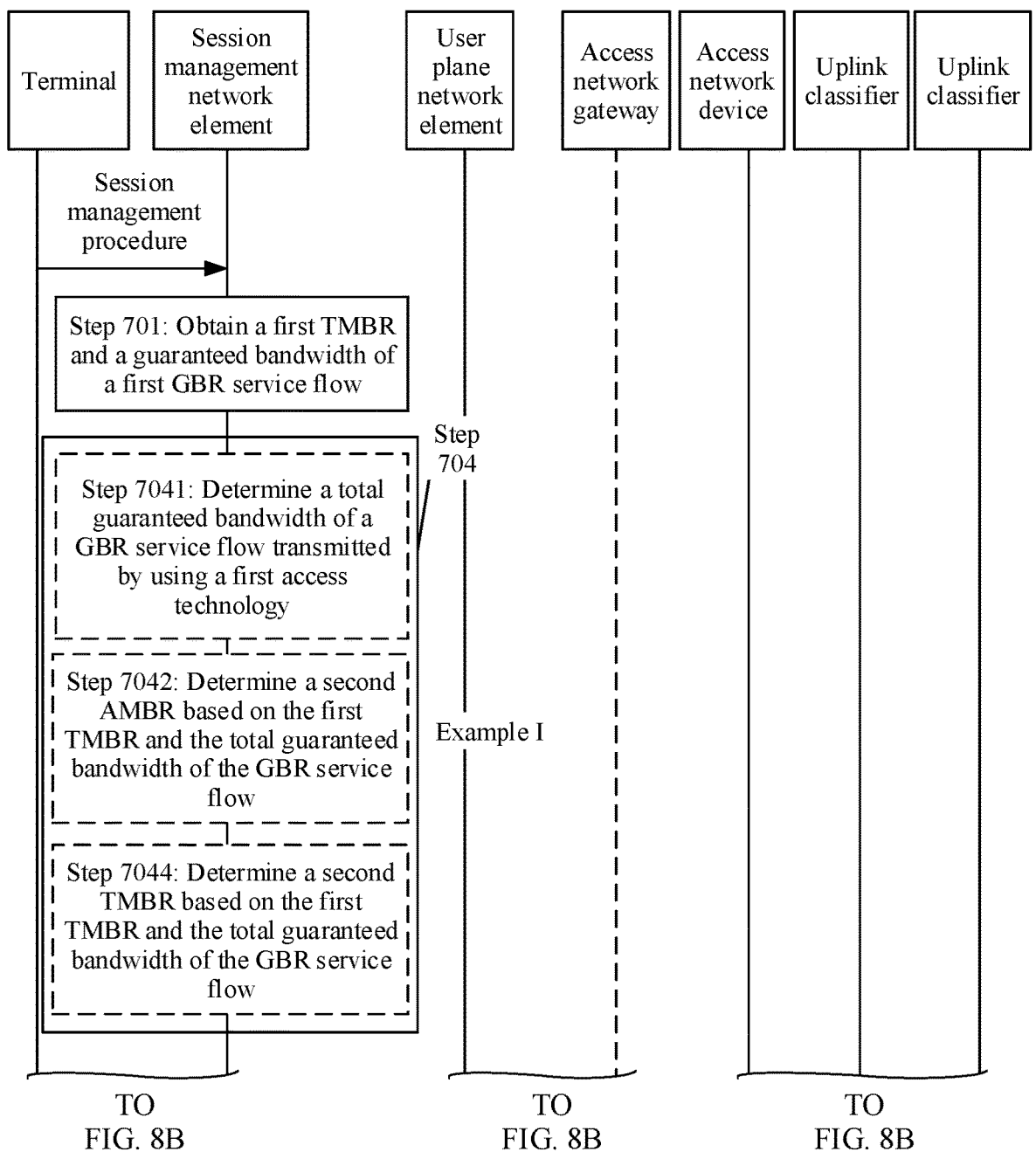
FIG. 8A to FIG. 8D are a schematic flowchart 2 of a method for controlling service flow transmission according to an embodiment of this application.
Figure 8B:
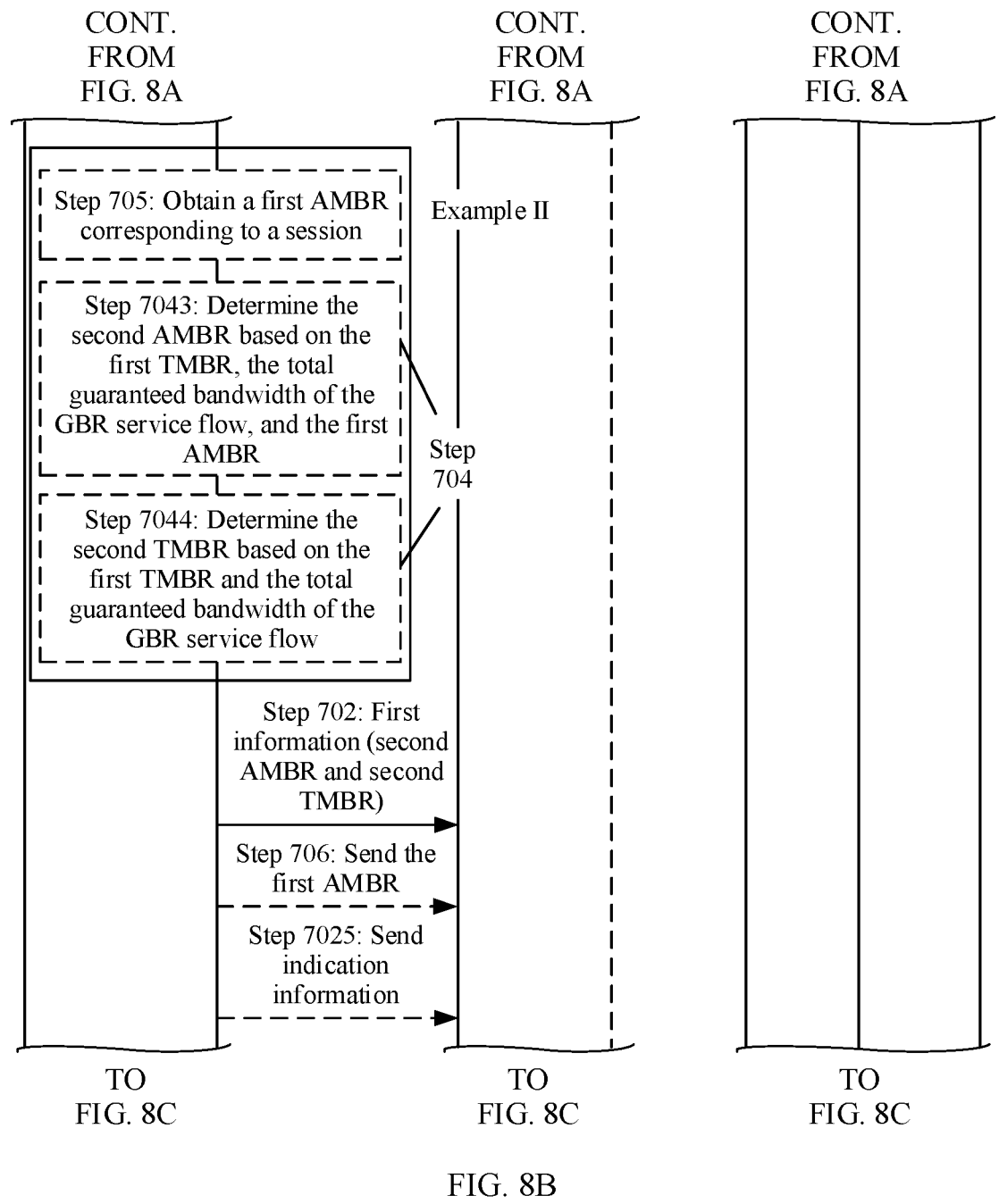
Figure 8C:
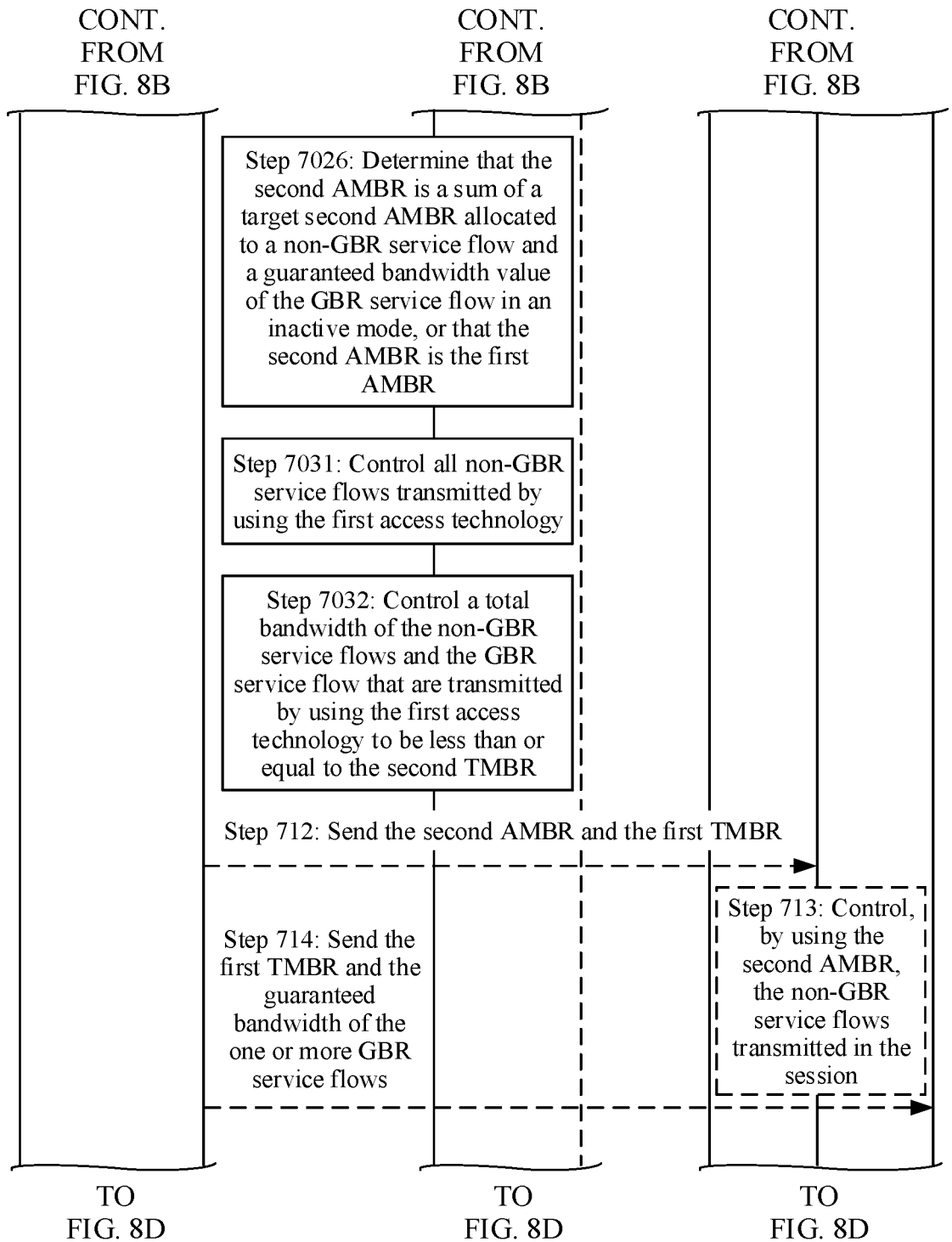
Figure 8D:
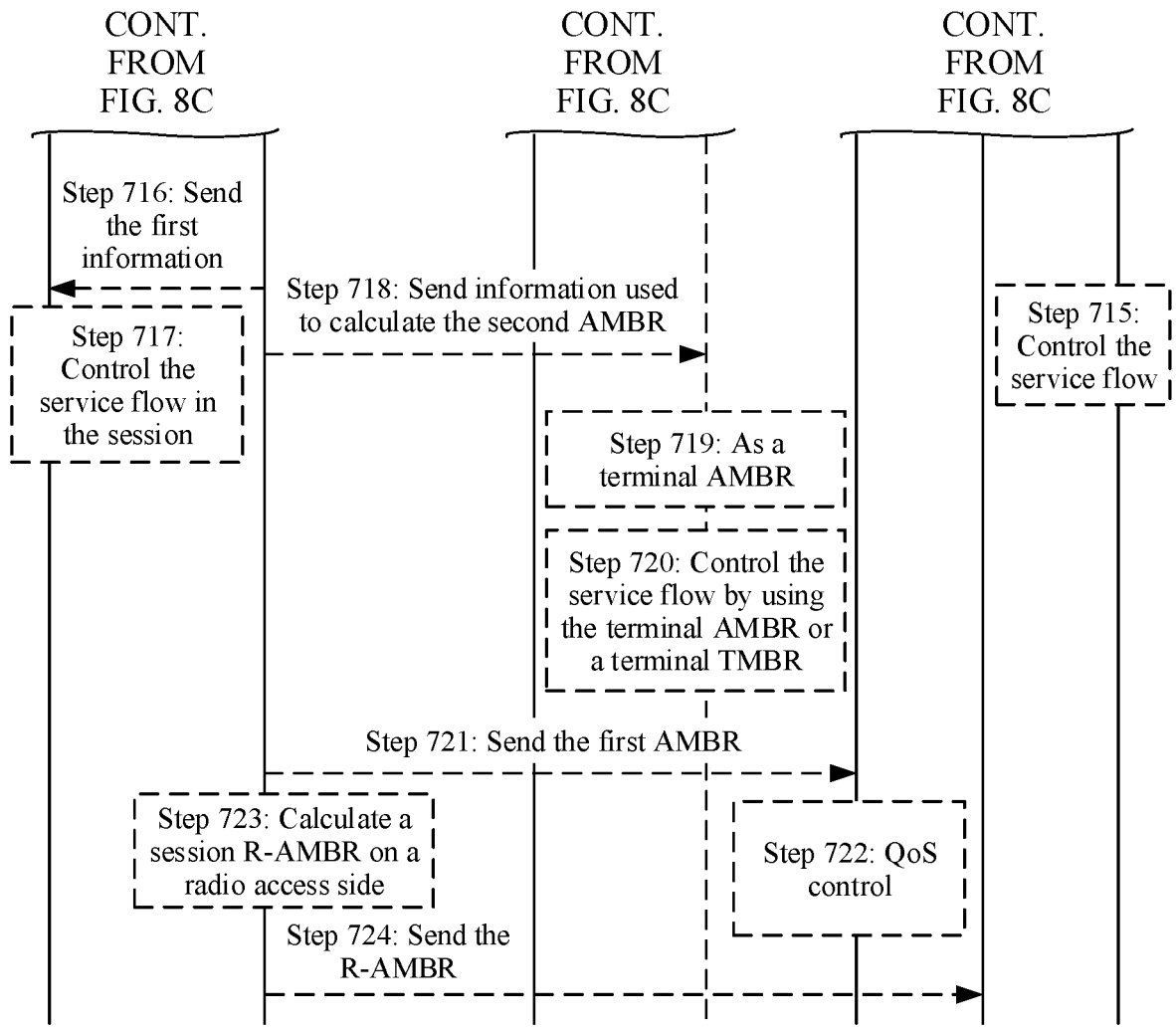

With reference to FIG. 3a and FIG. 3b, as shown in FIG. 7, an embodiment of this application provides a method for controlling service flow transmission. In this method, an example in which a data plane network element is the user plane network element 20 is used. The method includes the following steps.

Step 701: The session management network element 10 obtains a first TMBR of a service flow transmitted in a session by using the first access technology and a guaranteed bandwidth of a first GBR service flow. The TMBR is used to indicate a maximum aggregate bandwidth value of all service flows transmitted in the session by using the first access technology.

In this embodiment of this application, the guaranteed bandwidth of the first GBR service flow may mean a guaranteed bandwidth of each GBR service flow in all GBR service flows (including at least one or more active GBR service flows) transmitted in the session by using the first access technology. The guaranteed bandwidth value of each GBR service flow may be obtained based on a QoS policy sent by a PCF network element, or may be obtained based on a local policy of the session management network element. When the GBR service flow is transmitted by using both the second access technology and the first access technology, the guaranteed bandwidth of the first GBR service flow includes only a guaranteed bandwidth value occupied by data that is of the GBR service flow and that is transmitted by using the first access technology. Alternatively, in this embodiment of this application, the guaranteed bandwidth of the first GBR service flow may mean a guaranteed bandwidth of each GBR service flow in at least one or more active GBR service flows transmitted in the session by using the first access technology.

The first TMBR in this embodiment of this application is a session-TMBR sent by the PCF network element, or a subscribed session-TMBR sent by a UDM network element. The guaranteed bandwidth of the first GBR service flow is a guaranteed bandwidth included in the QoS policy sent by the PCF or a guaranteed bandwidth obtained based on the local policy. The session management network element 10 may obtain the guaranteed bandwidth of the first GBR service flow from the PCF network element, or the PCF network element determines a first GBR based on a locally configured policy. When the GBR service flow is transmitted by using both the first access technology and the second access technology, the session management network element 10 obtains the guaranteed bandwidth value of the GBR service flow from the PCF network element, and the session management network element 10 determines, based on the guaranteed bandwidth value, that the guaranteed bandwidth of the first GBR service flow in the GBR service flow is a guaranteed bandwidth for transmission by using the first access technology. Certainly, in this embodiment of this application, the session management network element 10 may obtain, from the PCF network element, a guaranteed bandwidth of a portion of the one or more GBR service flows transmitted in the session by using the first access technology. In addition, the session management network element 10 determines a guaranteed bandwidth of another remaining GBR service flow in the one or more GBR service flows based on the locally configured policy.

For example, the session management network element 10 may obtain, from the PCF network element, that a guaranteed bandwidth of a GBR service flow 1 transmitted in the session by using the first access technology is 10 M, and the session management network element 10 determines, based on the locally configured policy, that a guaranteed bandwidth of a GBR service flow 2 transmitted in the session by using the first access technology is 5 M.

Specifically, the session management network element 10 obtains subscription data from the UDM network element. The subscription data of a terminal includes the first TMBR (namely, a first session-TMBR, first TMBR for short in the following descriptions) for the first access technology. Optionally, the session management network element 10 sends the foregoing parameter (for example, the first TMBR for the first access technology) to the PCF network element, and the PCF network element authorizes the parameter based on a policy. For example, the PCF network element further modifies the parameter based on the policy. After the PCF network element modifies the parameter, the session management network element 10 uses the modified parameter as the first TMBR, that is, obtains the first TMBR from the PCF network element.

For example, the session in this embodiment of this application may be a PDU session or a public data network (PDN) connection. For example, the session is the PDU session. The PDU session in this embodiment of this application refers to a data transmission channel that is established by the session management network element 10, that connects the terminal 30 to the user plane network element 20, and that reaches a DN. Network elements related to the data transmission channel include the terminal, the access network device, and the user plane network element 20 selected by the session management network element 10 for the session. The data transmission channel includes a plurality of links between two adjacent network elements, for example, includes a link between the terminal and the access network device, a link between the access network device and the user plane network element 20, and a link between UPF network element and the DN.

It may be understood that, in this embodiment of this application, before step 701, the method may further include: The session management network element 10 determines to manage (for example, establish or update) the session of the terminal. For example, the terminal initiates a session management procedure to the session management network element 10. This is the same as that in a conventional technology. For example, the session management procedure may include a session establishment procedure or a session update (which may also be referred to as session modification) procedure. The session management procedure may also be used to establish or update an MA-PDU session, and support transmission based on both the first access technology and the second access technology. To be specific, the terminal sends a PDU session establishment request message or a PDU session modification request message to the session management network element 10.

The session in this embodiment of this application is a single access session supporting the first access technology, or the session is a multi-access session supporting the first access technology and the second access technology.

Step 702: The session management network element 10 sends first information to the user plane network element 20, so that the user plane network element 20 receives the first information from the session management network element 10. The first information is used by the user plane network element 20 to determine any one or more of the following information: a first aggregate maximum bit rate (AMBR) of the session, a second aggregate maximum bit rate (AMBR) corresponding to the first access technology in the session, the first TMBR, and a second TMBR. The second AMBR is used to indicate a maximum aggregate bandwidth of a non-GBR service flow transmitted in the session by using the first access technology.

For example, the session management network element 10 sends an N4 message to the user plane network element 20, so that the user plane network element 20 receives the N4 message from the session management network element. The N4 message carries the first information.

The second AMBR in this embodiment of this application is a maximum aggregate bandwidth of a non-GBR service flow that is allowed by a network side to be transmitted in the session by using the first access technology during actual transmission, namely, an available maximum aggregate bandwidth of the non-GBR service flow transmitted in the session during actual transmission. The second TMBR is a maximum bandwidth value of all non-GBR service flows and all GBR service flows that are allowed by the network side to be transmitted in the session by using the first access technology during actual transmission.

In this embodiment of this application, the second AMBR may be equal to the first AMBR, or the second AMBR may be less than the first AMBR. The second TMBR may be equal to the first TMBR, or the second TMBR may be less than the first TMBR.

In this embodiment of this application, that the first information is used by the user plane network element 20 to determine at least one of the second AMBR and the second TMBR that are corresponding to the first access technology in the session may include the following two cases: (1) The first information includes at least one of the second AMBR and the second TMBR. In this case, the session management network element 10 calculates at least one of the second AMBR and the second TMBR, and sends the at least one of the second AMBR and the second TMBR to the user plane network element 20. (2) The first information includes a parameter used to calculate the second AMBR. In this case, the user plane network element 20 independently calculates the second AMBR based on the parameter used to calculate the second AMBR. For example, the parameter used to calculate the second AMBR may include the first TMBR and the guaranteed bandwidth of each GBR service flow in the one or more GBR service flows transmitted in the session by using the first access technology. Alternatively, the parameter used to calculate the second AMBR may include the second TMBR and the guaranteed bandwidth of each GBR service flow in the one or more GBR service flows transmitted in the session by using the first access technology.

Step 703: The user plane network element 20 controls, based on at least one of the second AMBR, the first TMBR, and the second TMBR, the service flow transmitted in the session by using the first access technology. For example, the service flow includes all the non-GBR service flows transmitted by using the first access technology, and/or all the GBR service flows transmitted by using the first access technology.

It should be understood that the user plane network element 20 may control, based on the second AMBR, all the non-GBR service flows transmitted in the session by using the first access technology. The user plane network element 20 may control, based on the second AMBR and the second TMBR, the GBR service flows and the non-GBR service flows that are transmitted in the session by using the first access technology. Specifically, the second AMBR is used to control the non-GBR service flows, and the second TMBR is used to control the GBR service flows and the non-GBR service flows. The user plane network element 20 may control, based on the second TMBR or the first TMBR, a total aggregate bandwidth of all the GBR service flows and non-GBR service flows that are transmitted in the session by using the first access technology to be less than or equal to the first TMBR or the second TMBR.

An embodiment of this application provides a method for controlling service flow transmission. In this method, a session management network element obtains a first TMBR of a service flow transmitted in a session by using a first access technology and a guaranteed bandwidth of a first GBR service flow, and sends first information to a user plane network element, so that the user plane network element determines at least one of a second AMBR, the first TMBR, and a second TMBR that are corresponding to the first access technology. Subsequently, the user plane network element may control, based on the at least one of the second AMBR, the first TMBR, and the second TMBR, the service flow transmitted in the session by using the first access technology, so that a QoS parameter control requirement required by the first access technology can be met.

In this embodiment of this application, the second AMBR may be calculated by a user plane network element 20, and the second AMBR and the second TMBR may also be calculated by a session management network element 10. The second AMBR and/or the second TMBR are/is calculated by different entities, and specific implementation processes are different. Details are separately described below.

Example (1)

The session management network element 10 calculates one or both of the second AMBR and the second TMBR.

In a possible implementation, the first information in this embodiment of this application includes any one or more of the following information: a first aggregate maximum bit rate (AMBR), the second AMBR, and the second TMBR. Alternatively, the first information in this embodiment of this application includes the second TMBR. Alternatively, the first information in this embodiment of this application includes the second AMBR and the second TMBR. The first information in this embodiment of this application includes the first AMBR. Alternatively, the first information in this embodiment of this application includes the second AMBR, the first AMBR, and the second TMBR.

In an optional implementation, the first information may further include a first access technology indication and a tunnel identifier corresponding to the first access technology. The first access technology indication is used to indicate that the first access technology is used for transmission. The tunnel identifier corresponding to the first access technology is used to determine a tunnel corresponding to the first access technology.

It should be understood that the first information includes a correspondence between the first access technology indication and the second AMBR, and/or a correspondence between the first access technology indication and the second TMBR. Alternatively, the first information includes a correspondence between the tunnel identifier corresponding to the first access technology and the second AMBR, and/or a correspondence between the tunnel identifier corresponding to the first access technology and the second TMBR.

The correspondence between the first access technology indication and the second AMBR indicates that an aggregate maximum bit rate of a non-GBR service flow transmitted in the session by using the first access technology indicated by the first access technology is the second AMBR. Alternatively, the correspondence between the tunnel identifier corresponding to the first access technology and the second AMBR indicates that an aggregate maximum bit rate of a non-GBR service flow transmitted in a tunnel indicated by the related tunnel identifier is the second AMBR.

As shown in FIG. 8A to FIG. 8D, in a possible embodiment, before step 702, the method provided in this embodiment of this application may further include the following steps.

Step 704: The session management network element 10 determines at least one of the second AMBR and the second TMBR based on the first TMBR and the guaranteed bandwidth of the first GBR service flow.

Example I

In a first possible implementation, that the session management network element 10 determines the second AMBR based on the first TMBR and the guaranteed bandwidth of the first GBR service flow may be implemented by performing step 7041 and step 7042.

Step 7041: The session management network element 10 determines, based on the guaranteed bandwidth of the first GBR service flow, a total guaranteed bandwidth of one or more GBR service flows transmitted in the session by using the first access technology.

It should be understood that, in this embodiment of this application, the session may include the one or more GBR service flows transmitted by using the first access technology, each GBR service flow in the one or more GBR service flows is corresponding to a guaranteed bandwidth of one first GBR service flow, and guaranteed bandwidths that are of first GBR service flows and corresponding to different GBR service flows may be the same or different. This is not limited in this embodiment of this application. The one or more GBR service flows are all active GBR service flows transmitted in the session by using the first access technology. The total guaranteed bandwidth of the one or more GBR service flows is a sum of the guaranteed bandwidths that are of the first GBR service flows and corresponding to the one or more GBR service flows.

The active GBR service flow in this embodiment of this application may be an ongoing GBR service flow. The user plane network element establishes a user plane channel for the GBR service flow, and reserves a corresponding bandwidth resource.

Step 7042: The session management network element 10 determines the second AMBR based on the first TMBR and the total guaranteed bandwidth of the one or more GBR service flows.

For example, step 7042 may be implemented in the following manner: The session management network element 10 determines that the second AMBR is a difference between the first TMBR and the total guaranteed bandwidth of the one or more GBR service flows. That is, the session management network element 10 subtracts the total guaranteed bandwidth of the one or more GBR service flows from the first TMBR, to obtain the second AMBR. That is, the second AMBR is the difference between the first TMBR and the total guaranteed bandwidth of the one or more GBR service flows transmitted in the session by using the first access technology.

For example, the first TMBR is 100 Mbps, and the active one or more GBR service flows include a GBR service flow 1 with a guaranteed bandwidth of 30 Mbps and a GBR service flow 2 with a guaranteed bandwidth of 20 Mbps. In this case, the session management network element 10 determines that the second AMBR is 100 Mbps−30 Mbps−20 Mbps=50 Mbps.

Example II

In a second possible embodiment, as shown in FIG. 8A to FIG. 8D, before step 704, the method provided in this embodiment of this application may further include the following steps.

Step 705: The session management network element 10 obtains the first AMBR corresponding to the session, where the first AMBR is used to indicate a maximum aggregate bandwidth of all non-GBR service flows in the session. The first AMBR may be obtained by the session management network element 10 from subscription data of a terminal, or may be obtained by the session management network element 10 from a PCF network element. This is not limited in this embodiment of this application.

Correspondingly, that the session management network element 10 determines the second AMBR based on the first TMBR and the guaranteed bandwidth of the first GBR service flow may be implemented by performing step 7043.

Step 7043: The session management network element 10 determines the second AMBR based on the first TMBR, the total guaranteed bandwidth of the one or more GBR service flows, and the first AMBR.

For example, the session management network element 10 compares the second AMBR with the first AMBR, and the session management network element 10 uses a smallest value in the second AMBR and the first AMBR as a final second AMBR. That is, if a difference between the first TMBR and the total guaranteed bandwidth of the one or more GBR service flows is greater than the first AMBR of the entire session, the first AMBR is used as the second AMBR. If the difference between the first TMBR and the total guaranteed bandwidth of the one or more GBR service flows is less than or equal to the first AMBR of the entire session, the difference between the first TMBR and the total guaranteed bandwidth of the one or more GBR service flows is used as the second AMBR.

Specifically, if the difference between the first TMBR and the total guaranteed bandwidth of the one or more GBR service flows is less than the first AMBR, the session management network element 10 determines that the second AMBR is the difference between the first TMBR and the total guaranteed bandwidth of the one or more GBR service flows. Alternatively, if the difference between the first TMBR and the total guaranteed bandwidth of the one or more GBR service flows is greater than the first AMBR, the session management network element 10 determines that the second AMBR is the first AMBR. That is, when the difference between the first TMBR and the total guaranteed bandwidth of the one or more GBR service flows transmitted in the session by using the first access technology is greater than the first AMBR, the second AMBR is the first AMBR.

It should be noted that a difference between Example I and Example II lies in that, in Example I, the session management network element 10 does not compare the first AMBR with the difference obtained by subtracting the total guaranteed bandwidth of the one or more GBR service flows from the first TMBR, that is, directly uses the difference obtained by subtracting the total guaranteed bandwidth of the one or more GBR service flows from the first TMBR as the second AMBR. In Example II, the session management network element 10 compares the first AMBR with the difference between the first TMBR and the total guaranteed bandwidth of the one or more GBR service flows, to determine the second AMBR.

If the session is a multi-access session, when the difference obtained by subtracting the total guaranteed bandwidth of the one or more GBR service flows from the first TMBR is less than the first AMBR, the session management network element 10 initiates a GBR service flow switching procedure, to use the second access technology to transmit a portion of the GBR service flows transmitted in the session by using the first access technology, so that the second AMBR is greater than or equal to the first AMBR. Then, the session management network element 10 may send only the first AMBR to the user plane network element. This is the same as the scenario in Example II.

In addition, if the second AMBR still cannot be greater than the first AMBR by adjusting the GBR service flows, the session management network element 10 sends an indication to the PCF network element. The indication is used to indicate that the second AMBR is less than the first AMBR. To be specific, a maximum bandwidth value of a non-GBR service flow transmitted in the session by using the first access technology is less than the maximum bandwidth of the non-GBR service flows in the entire session. In this case, the PCF network element updates a split mode based on the indication. For example, a priority-based split mode is sent to indicate that after a bandwidth for the first access technology is preferentially occupied fully, a remaining service flow is transmitted by using the second access technology.

If the session is a multi-access session, when the difference obtained by subtracting the total guaranteed bandwidth of the one or more GBR service flows from the first TMBR is greater than the first AMBR, the session management network element 10 sends the first AMBR to the user plane network element, and does not need to send the second AMBR. Correspondingly, step 703 may be implemented in the following manner: The user plane network element controls, by using the first AMBR, non-GBR service flows transmitted in the session by using the first access technology and the second access technology.

In this embodiment of this application, that the session management network element 10 determines the second TMBR based on the first TMBR and the guaranteed bandwidth of the first GBR service flow may be implemented in the following manner:

Step 7044: The session management network element 10 determines the second TMBR based on the first TMBR and the total guaranteed bandwidth of the one or more GBR service flows split on an uplink classifier corresponding to the first access technology.

For example, step 7044 in this embodiment of this application may be specifically implemented in the following manner: The session management network element 10 determines the second TMBR by subtracting, from the first TMBR, the total guaranteed bandwidth of the one or more GBR service flows split on the uplink classifier corresponding to the first access technology. That is, the second TMBR is a difference between the first TMBR and the total guaranteed bandwidth of the one or more GBR service flows split on the uplink classifier corresponding to the first access technology.

In this embodiment of this application, before the service flow reaches the user plane network element (for example, an anchor user plane network element) through the uplink classifier, the uplink classifier may split a portion of the GBR service flow. The split portion of the GBR service flow is directly sent from the uplink classifier to an external network without passing through the user plane network element (for example, the anchor user plane network element).

Correspondingly, as shown in FIG. 8A to FIG. 8D, before step 703, the method provided in this embodiment of this application may further include the following step.

Step 706: The session management network element 10 sends the first AMBR corresponding to the session to the user plane network element 20, so that the user plane network element 20 receives the first AMBR corresponding to the session from the session management network element 10.

The first AMBR, the first TMBR, and the guaranteed bandwidth of the first GBR service flow may be carried in a same message and sent by the session management network element 10 to the user plane network element 20. Alternatively, a message carrying the first AMBR is different from a message carrying the first TMBR and the guaranteed bandwidth of the first GBR service flow.

Correspondingly, step 703 in this embodiment of this application may be implemented by performing step 7031 and/or step 7032.

Step 7031: The user plane network element 20 controls, based on the second AMBR, all non-GBR service flows transmitted in the session by using the first access technology.

For example, step 7031 in this embodiment of this application may be specifically implemented in the following manner: The user plane network element 20 controls a total bandwidth of the non-GBR service flows transmitted in the session by using the first access technology or a tunnel corresponding to the first access technology to be less than or equal to the second AMBR.

Optionally, if the method provided in this embodiment of this application further includes that the user plane network element 20 obtains the first AMBR, step 7031 may be implemented in the following manner: In addition, if the session is a multi-access session, the user plane network element 20 may further control a total aggregate bandwidth of all the non-GBR service flows transmitted in the session by using the first access technology and all the non-GBR service flows transmitted by using the second access technology to be less than or equal to the first AMBR.

Step 7032: The user plane network element 20 controls a total bandwidth of all the non-GBR service flows and all GBR service flows that are transmitted in the session by using the first access technology to be less than or equal to the second TMBR.

For example, the second TMBR is 500 Mbps, and the total bandwidth of all the non-GBR service flows and all the GBR service flows that are transmitted by using the first access technology is less than or equal to 500 Mbps.

It should be noted that if the user plane network element 20 receives the second AMBR from the session management network element 10, the user plane network element 20 may directly control the non-GBR service flow by using the second AMBR. If the user plane network element 20 receives the second TMBR from the session management network element 10, but does not receive the second AMBR, (1) the user plane network element 20 needs to calculate the second AMBR by using the second TMBR, and then perform step 7031. For example, the user plane network element 20 subtracts the total guaranteed bandwidth of the one or more GBR service flows from the second TMBR, to obtain the second AMBR. Alternatively, (2) the user plane network element 20 directly performs step 7031, that is, does not calculate the second AMBR, but controls, by using the second TMBR, all the non-GBR service flows and all the GBR service flows that are transmitted in the session by using the first access technology.

Example (2)

The user plane network element 20 calculates the second AMBR.

Correspondingly, the first information in this embodiment of this application includes the first TMBR or the second TMBR. In addition, the first information may further include a guaranteed bandwidth of each GBR service flow in one or more GBR service flows transmitted in the session by using the first access technology. Alternatively, the first information includes the first TMBR or the second TMBR. In addition, the first information may further include a total guaranteed bandwidth of the one or more GBR service flows transmitted in the session by using the first access technology. If the session management network element sends the total guaranteed bandwidth of the one or more GBR service flows, a process in which the user plane network element 20 determines the total guaranteed bandwidth of the one or more GBR service flows based on the guaranteed bandwidth of each GBR service flow may be omitted subsequently.

Figure 9A:
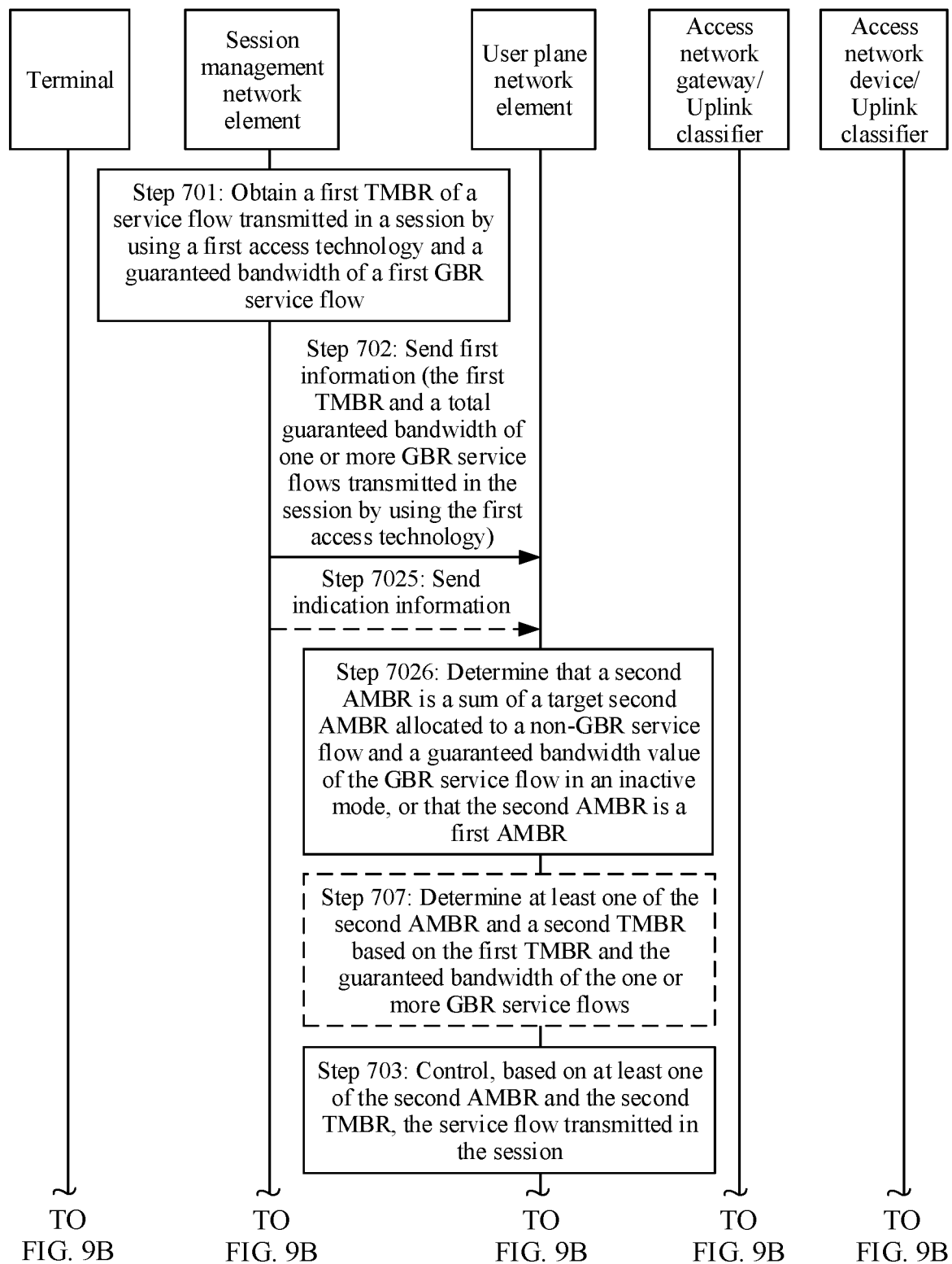
FIG. 9A to FIG. 9C are a schematic flowchart 3 of a method for controlling service flow transmission according to an embodiment of this application.
Figure 9B:
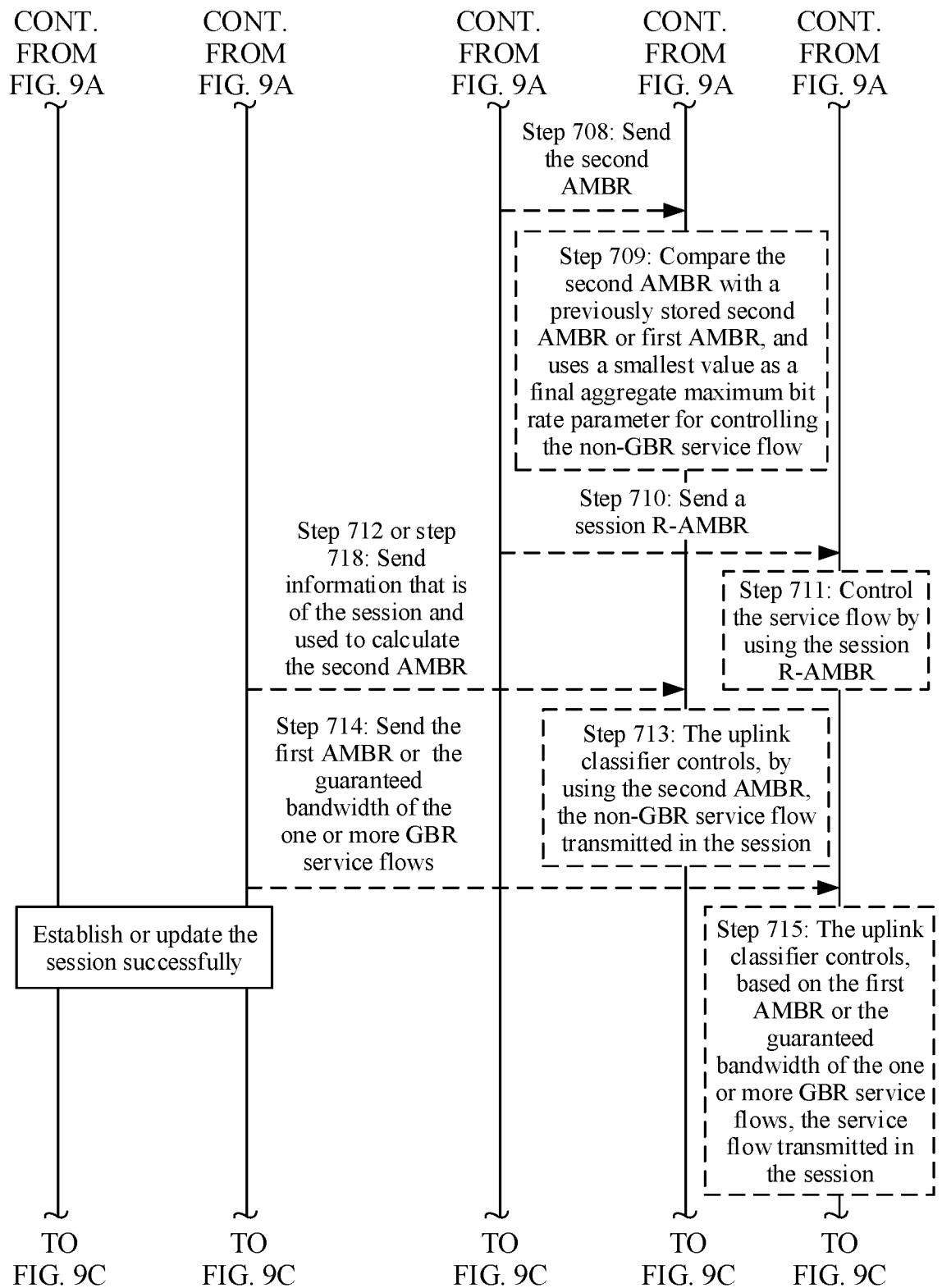
Figure 9C:
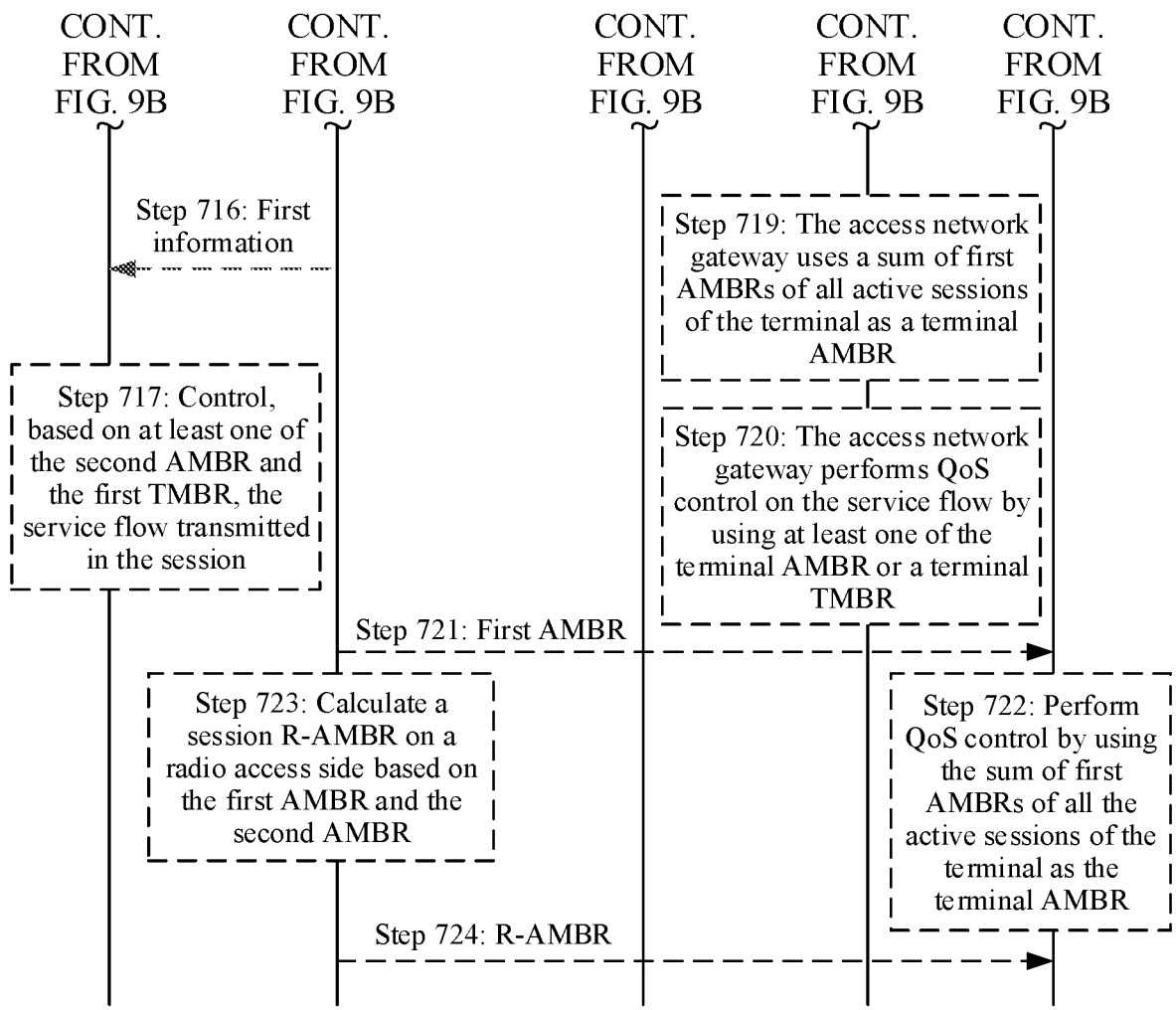

As shown in FIG. 9A to FIG. 9C, if the first information includes the first TMBR or the second TMBR, in still another possible embodiment of this application, before step 703, the method provided in this embodiment of this application may further include the following step.

Step 707: The user plane network element 20 determines the second AMBR based on the first TMBR or the second TMBR and a guaranteed bandwidth of each GBR service flow in one or more GBR service flows.

In a possible implementation, step 707 in this embodiment of this application may be specifically implemented in the following manner: The user plane network element 20 determines a total guaranteed bandwidth of the one or more GBR service flows based on the guaranteed bandwidth of each GBR service flow. The user plane network element 20 determines that the second AMBR is a difference between the first TMBR and the total guaranteed bandwidth of the one or more GBR service flows. Alternatively, the user plane network element 20 determines that the second AMBR is a difference between the second TMBR and the total guaranteed bandwidth of the one or more GBR service flows.

In another possible implementation, step 707 in this embodiment of this application may be specifically implemented in the following manner: If the user plane network element 20 obtains the first AMBR, a difference between one of the first TMBR or the second TMBR and the total guaranteed bandwidth of the one or more GBR service flows is greater than the first AMBR, and the user plane network element 20 determines that the second AMBR is the first AMBR. When the difference between the first TMBR/second TMBR and the total guaranteed bandwidth of the one or more GBR service flows is less than the first AMBR, the user plane network element 20 determines that the second AMBR is the difference between one of the first TMBR or the second TMBR and the total guaranteed bandwidth of the one or more GBR service flows.

In still another possible implementation, step 707 in this embodiment of this application may be specifically implemented in the following manner: Alternatively, the user plane network element 20 determines that the second AMBR is any value less than a first difference. The first difference is a difference between the first TMBR/second TMBR and the total guaranteed bandwidth of the one or more GBR service flows.

As shown in FIG. 9A to FIG. 9C, step 703 in this embodiment of this application may be specifically implemented in the following manner: The user plane network element 20 controls a total aggregate bandwidth of all non-GBR service flows transmitted in the session by using the first access technology to be less than or equal to the second AMBR.

If the first information received by the user plane network element 20 includes the first TMBR or the second TMBR, when the user plane network element 20 does not calculate the second AMBR, step 703 in this embodiment of this application may be specifically implemented in the following manner: The user plane network element 20 controls a total aggregate bandwidth of all GBR service flows and non-GBR service flows that are transmitted in the session by using the first access technology to be less than or equal to the first TMBR or the second TMBR.

If the session is a multi-access session, the user plane network element 20 selects an access technology for the service flow based on at least one of the second AMBR, the first TMBR, or the second TMBR. Specifically, the user plane network element 20 selects, based on a split mode, the first access technology to transmit the service flow. However, if the service flow exceeds a maximum bandwidth value of any one of the second AMBR, the first TMBR, or the second TMBR, the user plane network element 20 selects the second access technology to transmit the service flow. This prevents a packet loss caused by a limited bandwidth when the first access technology is used for transmission. For example, the split mode indicates to select a link with minimum round-trip time (RTT) for transmission, and the user plane network element 20 detects RTT of a 3GPP link and RTT of a non-3GPP link. If RTT that is of a link and corresponding to the first access technology is less than RTT that is of a link and corresponding to the second access technology, the user plane network element 20 should select, based on the split mode, the first access technology to transmit the service flow. However, if a bandwidth corresponding to the first access technology cannot support the service flow in this case, the user plane network element 20 still selects the second access technology to transmit the service flow.

For example, the split mode may include at least one parameter of a load balancing indication, an active link and candidate link indication, an optimal link indication, a minimum link delay indication, an RTT indication, a minimum link load indication, a maximum link bandwidth indication, or a strongest access signal indication.

It should be noted that, after the user plane network element 20 selects an access technology for the non-GBR service flows based on the split mode, if a total aggregate bandwidth for transmitting the non-GBR service flows in the session is greater than the second AMBR, the user plane network element 20 may reselect an access technology for the non-GBR service flows. If a total aggregate bandwidth for transmitting the service flows in the session is greater than the first TMBR or the second TMBR, an access technology may be selected for the non-GBR service flows or the GBR service flows.

In a possible implementation, the method provided in this embodiment of this application further includes: The session management network element 10 sends indication information to the user plane network element 20, to indicate the user plane network element 20 to select an access technology for the service flow based on at least one of the second AMBR, the first TMBR, or the second TMBR.

In still another possible embodiment, as shown in FIG. 9A to FIG. 9C, the method provided in this embodiment of this application further includes the following steps.

Step 708: The user plane network element 20 sends the second AMBR to the access network gateway 40 and the uplink classifier 60 that are corresponding to the first access technology, so that the access network gateway 40 and the uplink classifier 60 receive the second AMBR from the user plane network element 20.

Optionally, step 708 may be implemented in the following manner: The user plane network element 20 sends a first message to the session management network element 10, so that the session management network element 10 forwards the first message to the access network gateway 40 and the uplink classifier 60 that are corresponding to the first access technology. The first message includes the second AMBR sent to the access network gateway 40 and the uplink classifier 60 that are corresponding to the first access technology.

Step 709: The access network gateway 40 or the uplink classifier 60 compares the second AMBR with a previously stored second AMBR or first AMBR, and uses a smallest value as a final aggregate maximum bit rate parameter for controlling the non-GBR service flow.

In still another possible embodiment, as shown in FIG. 9A to FIG. 9C, the method provided in this embodiment of this application further includes the following steps.

Step 710: The user plane network element 20 sends a session R-AMBR to the access network device 50 and the uplink classifier 70 that are corresponding to the second access technology, so that the access network gateway 40 and the uplink classifier 60 receive the session R-AMBR from the user plane network element 20.

Step 711: The access network device 50 or the uplink classifier 70 controls the service flow by using the session R-AMBR. The session R-AMBR is an aggregate maximum bit rate parameter of all non-GBR service flows transmitted in the PDU session by using the second access technology.

In still another possible embodiment, if the communication system further includes the uplink classifier 60 corresponding to the first access technology and the uplink classifier 70 corresponding to the second access technology, with reference to FIG. 3a or FIG. 3b, as shown in FIG. 8A to FIG. 8D or FIG. 9A to FIG. 9C, the method provided in this embodiment of this application further includes the following steps.

Step 712: The session management network element 10 sends, to the uplink classifier 60 corresponding to the first access technology, information that is of the session and used to calculate the second AMBR, so that the uplink classifier 60 receives the information used to calculate the second AMBR.

For example, the information used to calculate the second AMBR includes any one or more of the following information: the second AMBR, the first AMBR, and the first TMBR.

For example, the session management network element 10 sends an N4 session identifier and the second AMBR to the uplink classifier 60, to indicate that an aggregate maximum bit rate of all non-GBR service flows that are in a session corresponding to the N4 session and transmitted by using the first access technology is the second AMBR. A session identifier and the N4 session identifier in this embodiment of this application are in a one-to-one correspondence.

For example, the session management network element 10 sends the first TMBR to the uplink classifier 60, and the uplink classifier 60 calculates the second AMBR based on the first TMBR and a total guaranteed bandwidth of at least one GBR service flow that is currently activated. That is, second AMBR=first TMBR−total guaranteed bandwidth of the at least one GBR service flow that is currently activated.

For example, the session management network element 10 sends the first AMBR and the first TMBR to the uplink classifier 60, and the uplink classifier 60 calculates the second AMBR based on the first TMBR and the total guaranteed bandwidth of the at least one GBR service flow that is currently activated. That is, second AMBR=first TMBR−total guaranteed bandwidth of the at least one GBR service flow that is currently activated. The uplink classifier 60 compares the first AMBR with the difference. If the first AMBR is less than or equal to the difference, the second AMBR is equal to the first AMBR.

Step 713: The uplink classifier 60 controls, by using the second AMBR, the non-GBR service flows transmitted in the session, that is, a total bandwidth of the non-GBR service flows transmitted by using the first access technology to be less than the second AMBR.

Step 714: The session management network element 10 sends the first AMBR of the session or the guaranteed bandwidth of the one or more GBR service flows to the uplink classifier 70 corresponding to the second access technology.

Step 715: The uplink classifier 70 controls, based on the first AMBR or the guaranteed bandwidth of the one or more GBR service flows, the service flow transmitted in the session.

Specifically, the uplink classifier 70 controls a sum of AMBRs of all the non-GBR service flows (including all the non-GBR service flows transmitted by using both the first access technology and the second access technology) transmitted in the session not to exceed the first AMBR. Alternatively, the uplink classifier 70 controls the one or more GBR service flows to meet the guaranteed bandwidth thereof.

It should be noted that step 712 to step 715 in this embodiment of this application are applicable to a scenario in which the session is a multi-access session, and are also applicable to a scenario in which there is an uplink classifier in a single access session.

In an optional embodiment, as shown in FIG. 8A to FIG. 8D or FIG. 9A to FIG. 9C, the method provided in this embodiment of this application may further include the following steps.

Step 716: The session management network element 10 sends the first information to the terminal.

Specifically, step 716 may be implemented in the following manner: After determining that the session is established or updated, the session management network element 10 sends a session establishment accept (PDU session establishment accept) message or a session modification command (PDU session modification command) to the terminal. The PDU session establishment accept or the PDU session modification command includes any one or more of the following information: the second AMBR and the first TMBR, to indicate that a maximum aggregate bandwidth value of the non-GBR service flows transmitted in the session by using the first access technology is the second AMBR, and a total bandwidth value of all the GBR service flows and non-GBR service flows that are transmitted by using the first access technology is less than or equal to the first TMBR. Optionally, the message further includes a first access technology indication, to indicate that the second AMBR or the first TMBR is a parameter related to the first access technology.

It should be understood that when a second AMBR parameter or a second TMBR parameter includes an access technology indication, the first access technology indication is an optional parameter. To be specific, after receiving the second AMBR or the second TMBR, a receiver may determine that the second AMBR or the second TMBR is a parameter associated with the first access technology. In this case, the first access technology indication or a tunnel identifier corresponding to the first access technology may be omitted.

Step 717: The terminal controls, based on at least one of the second AMBR and the first TMBR, the service flow transmitted in the session.

For example, step 717 may be implemented in the following manner: The terminal controls an aggregate maximum bit rate value of the non-GBR service flows transmitted in the session by using the first access technology not to exceed the second AMBR, and/or the terminal controls a sum of the aggregate maximum bit rate value of the non-GBR service flows transmitted in the session by using the first access technology and a guaranteed bandwidth value of the GBR service flows transmitted by using the first access technology not to exceed (that is, less than or equal to) the first TMBR.

In an optional embodiment, as shown in FIG. 8A to FIG. 8D or FIG. 9A to FIG. 9C, the method provided in this embodiment of this application may further include the following steps.

Step 718: The session management network element 10 sends, to the access network gateway 40 corresponding to the first access technology, information used to calculate the second AMBR, so that the access network gateway 40 receives, from the session management network element 10, the information used to calculate the second AMBR.

For example, the information used to calculate the second AMBR includes any one or more of the following information: the second AMBR and the first TMBR.

For example, the session management network element 10 sends an N2 message (N2 information) to the access network gateway 40, so that the access network gateway 40 receives the N2 message from the session management network element 10. The N2 message includes an identifier of the session and any one or more of the following information: the second AMBR and the first TMBR. In this way, the access network gateway 40 may determine that a maximum aggregate bandwidth value of all the non-GBR service flows in the session associated with the identifier of the session is the second AMBR, and a total bandwidth value of all the service flows is less than or equal to the first TMBR.

For example, the information used to calculate the second AMBR includes the first TMBR. In this case, the access network gateway 40 calculates the second AMBR based on the first TMBR and the total guaranteed bandwidth of the one or more GBR service flows that are currently activated. That is, second AMBR of the session=first TMBR−total guaranteed bandwidth of the at least one or more GBR service flows that are currently activated.

Step 719: The access network gateway 40 uses a sum of first AMBRs of all active sessions of the terminal as a terminal AMBR.

Step 720: The access network gateway 40 performs QoS control on the service flow by using at least one of the terminal AMBR (UE-AMBR) or a session TMBR.

For example, step 720 may be implemented in the following manner: The access network gateway 40 controls a total maximum aggregate bandwidth value of all non-GBR service flows transmitted in all the active sessions of the terminal to be less than or equal to the terminal AMBR, and a total bandwidth of all service flows transmitted by using the first access technology to be less than or equal to the session TMBR. In still another possible embodiment, with reference to FIG. 3b, as shown in FIG. 8A to FIG. 8D or FIG. 9A to FIG. 9C, the method provided in this embodiment of this application further includes the following steps.

Step 721: The session management network element 10 sends, to the access network device 50 corresponding to the second access technology, the first AMBR corresponding to the session, so that the access network device 50 receives, from the session management network element 10, the first AMBR corresponding to the session.

For example, the session management network element 10 sends the N2 message to the access network device corresponding to the second access technology, so that the access network device receives the N2 message. The N2 message carries the identifier of the session and the first AMBR.

Step 722: The access network device 50 performs QoS control by using the sum of the first AMBRs of all the active sessions of the terminal as the terminal AMBR.

For example, step 722 may be implemented in the following manner: The access network device controls the total maximum aggregate bandwidth value of all the non-GBR service flows of the terminal to be less than or equal to the terminal AMBR determined by the access network device. For example, all the active sessions of the terminal include a PDU session 1 and a PDU session 2, a first AMBR of the PDU session 1 is 20 Mbps, and a first AMBR of the PDU session 2 is 5 Mbps. In this case, the terminal AMBR determined by the access network device is 25 Mbps. In this way, the access network device needs to control the sum of all the non-GBR service flows transmitted in all the active sessions of the terminal to be less than or equal to 25 Mbps.

In an optional embodiment, as shown in FIG. 8A to FIG. 8D or FIG. 9A to FIG. 9C, the method provided in this embodiment of this application may further include the following steps.

Step 723: The session management network element 10 calculates a session R-AMBR on a second access technology side based on the first AMBR and the second AMBR.

The session R-AMBR indicates an AMBR at a session granularity, and indicates a maximum aggregate bandwidth of all the non-GBR service flows transmitted by using the second access technology.

For example, step 723 may be implemented in the following manner: session R-AMBR=first AMBR−second AMBR.

Step 724: The session management network element 10 sends the session R-AMBR to the access network device 50, so that the access network device 50 receives the session R-AMBR from the session management network element. The access network device controls, based on the session R-AMBR, all the non-GBR service flows transmitted by using the second access technology, that is, a total bandwidth value of all the non-GBR service flows transmitted by using the second access technology to be less than or equal to the session R-AMBR.

In an optional implementation, the method provided in this embodiment of this application further includes: The session management network element 10 sends the session R-AMBR and a second access technology indication, or the session R-AMBR and second access technology tunnel information to the user plane network element. In addition, the session management network element 10 sends the first AMBR to the user plane network element. It is the same as a conventional technology that, the first AMBR is used to indicate a maximum aggregate bandwidth value of all the non-GBR service flows (including service flows transmitted by using the first access technology and the second access technology) of the session.

It should be noted that all actions performed by the user plane network element in FIG. 7 to FIG. 9A to FIG. 9C in embodiments of this application may alternatively be performed by the terminal. That is, the user plane network element may be replaced with the terminal.

Figure 10:
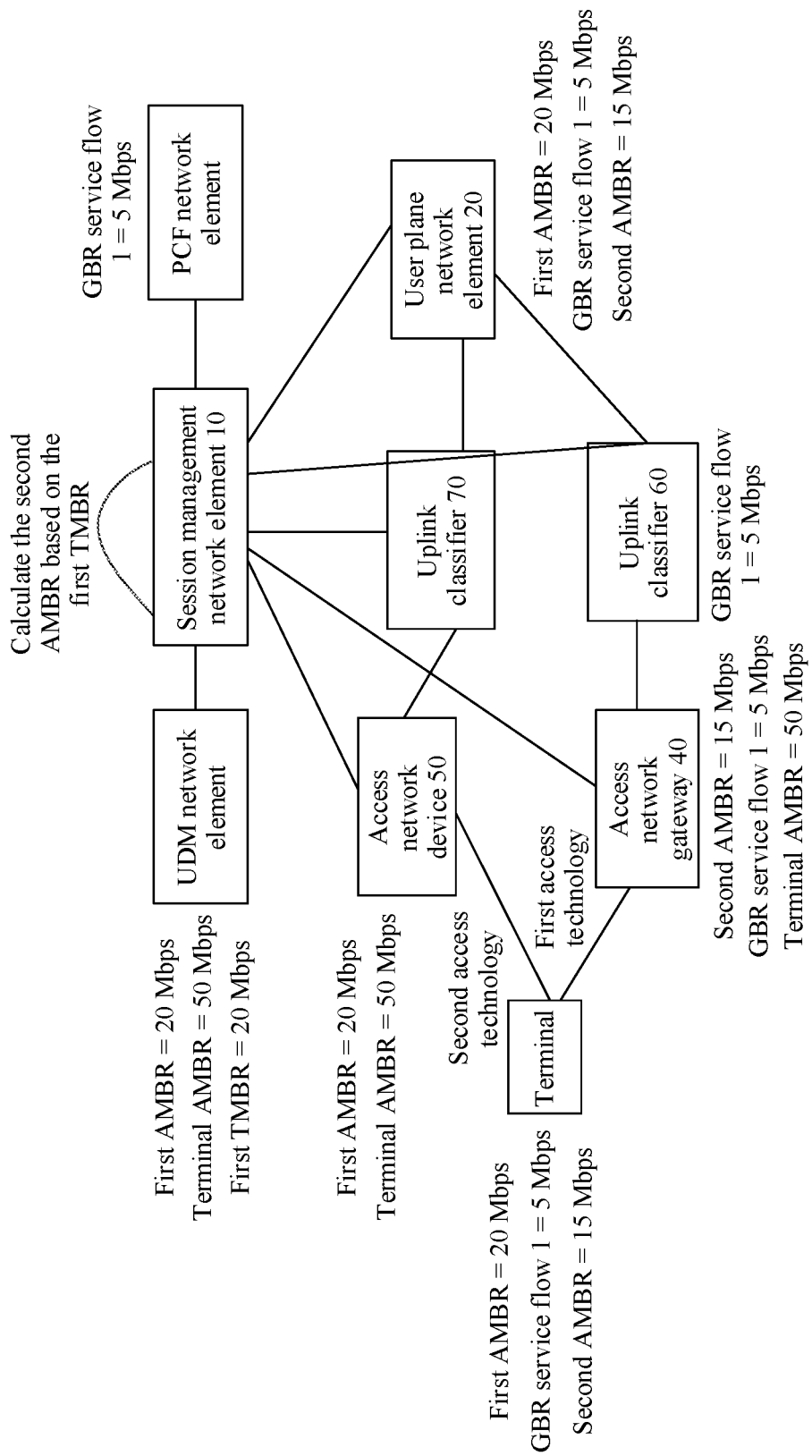
FIG. 10 is a schematic diagram of calculating a service flow control parameter by a session management network element according to an embodiment of this application.

It should be noted that all actions performed by the session management network element 10 in FIG. 7 or FIG. 8A to FIG. 8D may be replaced with the PCF network element. When the session management network element is replaced with the PCF network element, the PCF network element may perform a related sending action by using the session management network element. For example, the session is a multi-access session. When the session management network element performs calculation, as shown in FIG. 10, the session management network element 10 obtains a first AMBR of 20 Mbps, a terminal AMBR of 50 Mbps, and a first TMBR of 20 Mbps from the UDM network element, and the session management network element 10 obtains a guaranteed bandwidth 5 Mbps of a GBR service flow 1 from the PCF network element. The GBR service flow 1 is transmitted on a first access technology side. Therefore, the session management network element 10 calculates that a second AMBR on the first access technology side is 15 Mbps based on the first TMBR and the guaranteed bandwidth 5 Mbps of the GBR service flow 1. The session management network element 10 sends the terminal AMBR of 50 Mbps and the first AMBR of 20 Mbps to the access network device 50, and the session management network element 10 sends the terminal AMBR of 50 Mbps, the guaranteed bandwidth 5 Mbps of the GBR service flow 1, the second AMBR of 15 Mbps, and/or the first TMBR of 20 Mbps to the access network gateway 40. The session management network element 10 sends the first AMBR of 20 Mbps, the second AMBR of 15 Mbps and/or the first TMBR of 20 Mbps, and the guaranteed bandwidth 5 Mbps of the GBR service flow 1 to the terminal. The session management network element 10 sends the first AMBR of 20 Mbps, the second AMBR of 15 Mbps and/or the first TMBR of 20 Mbps, and the guaranteed bandwidth 5 Mbps of the GBR service flow 1 to the user plane network element. The session management network element 10 sends the guaranteed bandwidth 5 Mbps of the GBR service flow 1 to the uplink classifier 60 corresponding to the access network gateway. In this way, the terminal and the user plane network element may control, based on the second AMBR of 15 Mbps, a non-GBR service flow transmitted on the first access technology side, so that the GBR service flow 1 and the non-GBR service flow transmitted in the session do not exceed the first TMBR of 20 Mbps.

For example, a GBR service flow 2 and the GBR service flow 1 are transmitted in the session, where the GBR service flow 1 with the guaranteed bandwidth of 5 Mbps is split at the uplink classifier 60 corresponding to the access network gateway. In this case, the session management network element 10 may determine that: second TMBR=20 Mbps−guaranteed bandwidth of the GBR service flow 1=15 Mbps. The GBR service flow 2 with a guaranteed bandwidth of 8 Mbps is routed by the user plane network element 20.

Figure 11:
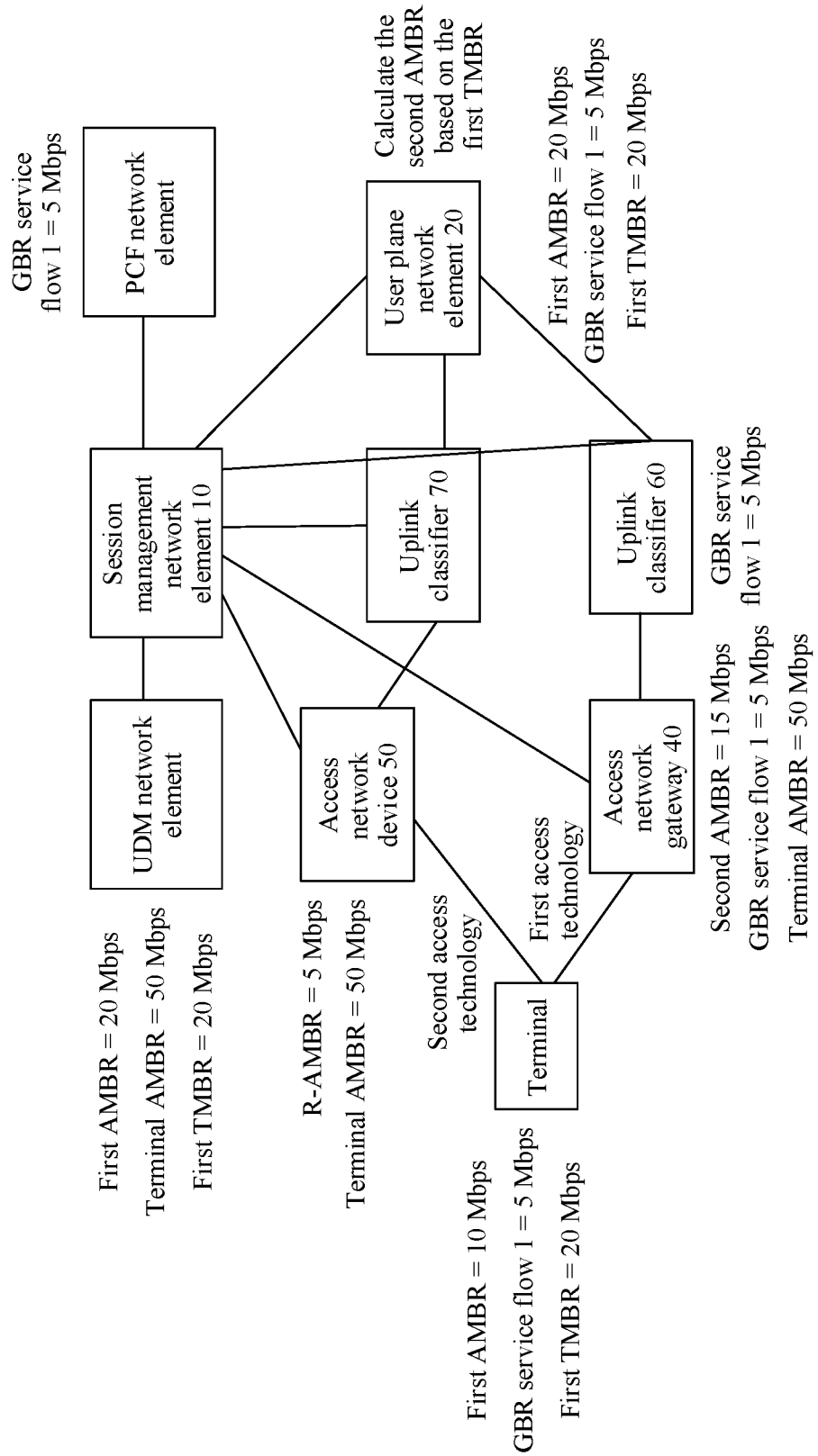
FIG. 11 is a schematic diagram of calculating a service flow control parameter by a user plane network element according to an embodiment of this application.

For example, the session is a multi-access session. When the user plane network element performs calculation, as shown in FIG. 11, the session management network element 10 obtains a first AMBR of 20 Mbps, a terminal AMBR of 50 Mbps, and a first TMBR of 20 Mbps from the UDM network element. The session management network element 10 obtains a guaranteed bandwidth 5 Mbps of a GBR service flow 1 from the PCF network element. The session management network element 10 sends the first AMBR of 20 Mbps, the guaranteed bandwidth 5 Mbps of the GBR service flow 1, and the first TMBR of 20 Mbps to the user plane network element 20. The GBR service flow 1 is transmitted on a first access technology side. Therefore, based on the first TMBR of 20 Mbps and the guaranteed bandwidth 5 Mbps of the GBR service flow 1, the user plane network element 20 calculates that a second AMBR on the first access technology side is 15 Mbps, and calculates that a second AMBR corresponding to the second access technology is 5 Mbps. The session management network element 10 sends the terminal AMBR of 50 Mbps and a session R-AMBR of 5 Mbps to the access network device 50. The user plane network element 20 sends the second AMBR of 15 Mbps to the access network gateway 40. The session management network element 10 sends the terminal AMBR of 50 Mbps and the guaranteed bandwidth 5 Mbps of the GBR service flow 1 to the access network gateway 40. The session management network element 10 sends, to the terminal, the first AMBR of 10 Mbps, the second AMBR of 15 Mbps corresponding to the first access technology, the second AMBR of 5 Mbps corresponding to the second access technology, and the guaranteed bandwidth 5 Mbps of the GBR service flow 1. The session management network element 10 sends the guaranteed bandwidth 5 Mbps of the GBR service flow 1 to the uplink classifier 60 corresponding to the access network gateway 40.

In a possible embodiment, as shown in FIG. 8A to FIG. 8D or FIG. 9A to FIG. 9C, the method provided in this embodiment of this application further includes the following steps.

Step 725: The session management network element sends indication information to the user plane network element, so that the user plane network element receives the indication information from the session management network element. The indication information indicates that when the GBR service flow transmitted in the session by using the first access technology is in an inactive mode, the second AMBR of the non-GBR service flow transmitted in the session by using the first access technology is a sum of a target second AMBR allocated to the non-GBR service flow and a guaranteed bandwidth value of the GBR service flow in the inactive mode, or the second AMBR is the first AMBR.

That the GBR service flow transmitted in the session by using the first access technology is in an inactive mode may be understood as that the GBR service flow transmitted by using the first access technology is not transmitted in the session.

Step 726: The user plane network element determines, based on the indication information, that the second AMBR is the sum of the target second AMBR allocated to the non-GBR service flow and the guaranteed bandwidth value of the GBR service flow in the inactive mode, or that the second AMBR is the first AMBR.

In a possible implementation, when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode.

In a possible implementation, when the sum of the target second AMBR and the guaranteed bandwidth value of the GBR service flow in the inactive mode is greater than or equal to the first AMBR, the second AMBR is the first AMBR.

The second AMBR also indicates that when a GBR service flow on which QoS control is performed based on the second AMBR is in an inactive mode, a bandwidth resource of the GBR service flow in the inactive mode may be used by the non-GBR service flow. To be specific, the session management network element sends the indication information to the user plane network element, so that the user plane network element determines that when the GBR service flow transmitted in the session by using the first access technology is in the inactive mode, a bandwidth resource of the GBR service flow in the inactive mode can be used by the non-GBR service flow. That is, a maximum bandwidth value (the second AMBR) that can be reached by the non-GBR service flow is equal to a sum of a second AMBR allocated to the non-GBR service flow and a guaranteed bandwidth value of the GBR service flow in the inactive mode or an inactive GBR QoS flow.

Optionally, the session management network element further sends, to the user plane network element, one or more of (a correspondence between the indication information and a first access technology indication), (a correspondence between the indication information and a tunnel identifier corresponding to the first access technology), or the indication information that is the second AMBR or a dynamic resource adjustment indication, to indicate a tunnel side corresponding to a tunnel or tunnel identifier corresponding to the first access technology. When the GBR service flow is in the inactive mode, a bandwidth resource of the GBR service flow can be used by the non-GBR service flow.

For example, a target second AMBR allocated to a non-GBR service flow transmitted in a session 1 by using the first access technology is 10 M, and a bandwidth resource allocated to a GBR service flow in the session 1 is 5 M. When the GBR service flow is not transmitted in the session 1, the user plane network element may determine that a second AMBR of the non-GBR service flow in the session 1 is 10 M+5 M=15 M. If the second AMBR of 15 M is greater than or equal to a first AMBR of 13 M of the session 1, the second AMBR of the non-GBR service flow is equal to the first AMBR of 13 M of the session 1. If the second AMBR of 15 M is less than a first AMBR of 20 M of the session 1, the second AMBR of the non-GBR service flow is equal to 15 M.

The foregoing mainly describes the solutions in embodiments of this application from a perspective of interaction between network elements. It may be understood that to implement the foregoing functions, the network elements, for example, the data plane network element and the session management network element, include hardware structures and/or software modules corresponding to the functions. A person skilled in the art should be easily aware that, in combination with examples of units and algorithm steps described in embodiments disclosed in this specification, this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the data plane network element and the session management network element each may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in embodiments of this application, division into the units is an example, and is merely logical function division. During actual implementation, another division manner may be used.

The foregoing describes the method in embodiments of this application with reference to FIG. 1 to FIG. 11. The following describes an apparatus for controlling service flow transmission that is provided in an embodiment of this application and that performs the foregoing method. A person skilled in the art may understand that the method and the apparatus may be mutually combined and referenced, and the apparatus for controlling service flow transmission provided in this embodiment of this application may perform steps performed by the user plane network element or the session management network element in the foregoing method for controlling service flow transmission.

Figure 12:
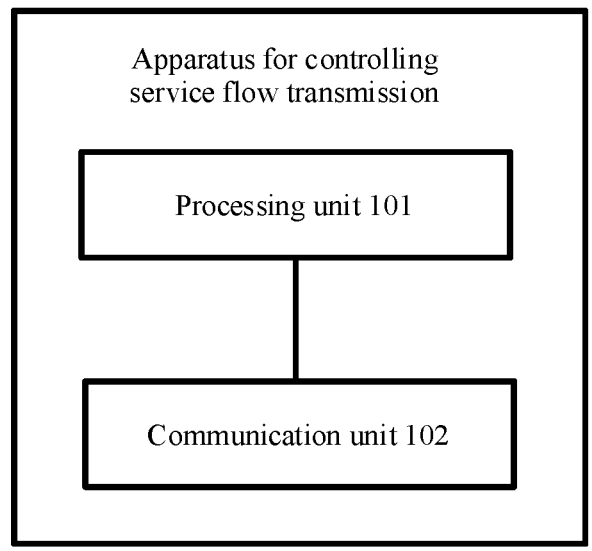
FIG. 12 is a schematic diagram of a structure of an apparatus for controlling service flow transmission according to an embodiment of this application.

When an integrated unit is used, FIG. 12 shows an apparatus for controlling service flow transmission in the foregoing embodiment. The apparatus for controlling service flow transmission may include a processing unit 101 and a communication unit 102.

For example, the apparatus for controlling service flow transmission is a session management network element, or is a chip used in the session management network element. In this case, the communication unit 102 is configured to support the apparatus for controlling service flow transmission in performing step 701 performed by the session management network element 10 in the foregoing embodiment in FIG. 7, FIG. 8A to FIG. 8D, or FIG. 9A to FIG. 9C, and support the apparatus for controlling service flow transmission in performing a sending action performed by the session management network element 10 in step 702 in the foregoing embodiment in FIG. 7, FIG. 8A to FIG. 8D, or FIG. 9A to FIG. 9C.

In a possible embodiment, the processing unit 101 is further configured to support the apparatus for controlling service flow transmission in performing step 704 (for example, step 7041 and step 7042, step 7043, or step 7044) performed by the session management network element 10 in the foregoing embodiment in FIG. 8A to FIG. 8D. The communication unit 102 is further configured to support the apparatus for controlling service flow transmission in performing step 705 performed by the session management network element 10 in the foregoing embodiment in FIG. 8A to FIG. 8D. The communication unit 102 is further configured to support the apparatus for controlling service flow transmission in performing the sending actions performed by the session management network element 10 in step 706, step 716, step 718, step 721, step 724, and step 725 in the foregoing embodiment in FIG. 8A to FIG. 8D. Alternatively, the communication unit 102 is further configured to support the apparatus for controlling service flow transmission in performing the sending actions performed by the session management network element 10 in step 712, step 714, step 716, step 718, step 721, step 724, and step 725 in the foregoing embodiment in FIG. 9A to FIG. 9C. The processing unit 101 is further configured to support the apparatus for controlling service flow transmission in performing step 723 in the foregoing embodiment in FIG. 8A to FIG. 8D or FIG. 9A to FIG. 9C.

For another example, the apparatus for controlling service flow transmission is a data plane network element, or is a chip used in the data plane network element. In this case, the communication unit 102 is configured to support the apparatus for controlling service flow transmission in performing the receiving action performed by the user plane network element in step 702 in the foregoing embodiment in FIG. 7. The processing unit 101 is configured to support the apparatus for controlling service flow transmission in performing step 703 performed by the user plane network element in the foregoing embodiment in FIG. 7.

In a possible embodiment, the communication unit 102 is configured to support the apparatus for controlling service flow transmission in performing the receiving actions performed by the user plane network element in step 706 and step 725 in the foregoing embodiment in FIG. 8A to FIG. 8D. The processing unit 101 is specifically configured to support the apparatus for controlling service flow transmission in performing step 7031, step 7032, and step 726 in the foregoing embodiment in FIG. 8A to FIG. 8D.

Alternatively, in a possible embodiment, the communication unit 102 is configured to support the apparatus for controlling service flow transmission in performing the sending actions in step 708 and step 710 and the receiving action performed by the user plane network element step 725 in the foregoing embodiment in FIG. 9A to FIG. 9C. The processing unit 101 is configured to support the apparatus for controlling service flow transmission in performing step 707 and step 726 in the foregoing embodiment in FIG. 9A to FIG. 9C.

Figure 13:
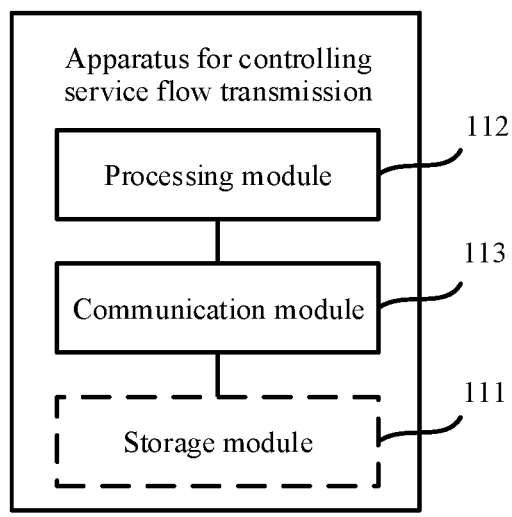
FIG. 13 is a schematic diagram of a structure of another apparatus for controlling service flow transmission according to an embodiment of this application.

When an integrated unit is used, FIG. 13 is a schematic diagram of a possible logical structure of the apparatus for controlling service flow transmission in the foregoing embodiments. The apparatus for controlling service flow transmission may include a processing module 112 and a communication module 113. The processing module 112 is configured to control and manage an action of the apparatus for controlling service flow transmission. For example, the processing module 112 is configured to control the apparatus for controlling service flow transmission to perform a step of performing information/data processing. The communication module 113 is configured to support the apparatus for controlling service flow transmission in performing a step of sending or receiving information/data.

In a possible embodiment, the apparatus for controlling service flow transmission may further include a storage module 111, configured to store program code and data of the apparatus for controlling service flow transmission.

For example, the apparatus for controlling service flow transmission is a session management network element, or is a chip used in the session management network element. In this case, the communication module 113 is configured to support the apparatus for controlling service flow transmission in performing step 701 performed by the session management network element 10 in the foregoing embodiment in FIG. 7, FIG. 8A to FIG. 8D, or FIG. 9A to FIG. 9C, and support the apparatus for controlling service flow transmission in performing a sending action performed by the session management network element 10 in step 702 in the foregoing embodiment in FIG. 7, FIG. 8A to FIG. 8D, or FIG. 9A to FIG. 9C.

In a possible embodiment, the processing module 112 is further configured to support the apparatus for controlling service flow transmission in performing step 704 (for example, step 7041 and step 7042, step 7043, or step 7044) performed by the session management network element 10 in the foregoing embodiment in FIG. 8A to FIG. 8D. The communication module 113 is further configured to support the apparatus for controlling service flow transmission in performing step 705 performed by the session management network element 10 in the foregoing embodiment in FIG. 8A to FIG. 8D. The communication module 113 is further configured to support the apparatus for controlling service flow transmission in performing the sending actions performed by the session management network element 10 in step 706, step 716, step 718, step 721, step 724, and step 725 in the foregoing embodiment in FIG. 8A to FIG. 8D. Alternatively, the communication module 113 is further configured to support the apparatus for controlling service flow transmission in performing the sending actions performed by the session management network element 10 in step 712, step 714, step 716, step 718, step 721, step 724, and step 725 in the foregoing embodiment in FIG. 9A to FIG. 9C. The processing module 112 is further configured to support the apparatus for controlling service flow transmission in performing step 723 in the foregoing embodiment in FIG. 8A to FIG. 8D or FIG. 9A to FIG. 9C.

For another example, the apparatus for controlling service flow transmission is a data plane network element, or is a chip used in the data plane network element. In this case, the communication module 113 is configured to support the apparatus for controlling service flow transmission in performing the receiving action performed by the user plane network element in step 702 in the foregoing embodiment in FIG. 7. The processing module 112 is configured to support the apparatus for controlling service flow transmission in performing step 703 performed by the user plane network element in the foregoing embodiment in FIG. 7.

In a possible embodiment, the communication module 113 is configured to support the apparatus for controlling service flow transmission in performing the receiving action performed by the user plane network element in step 706 and the receiving action performed by the user plane network element in step 725 in the foregoing embodiment in FIG. 8A to FIG. 8D. The processing module 112 is specifically configured to support the apparatus for controlling service flow transmission in performing step 7031, step 7032, and step 726 in the foregoing embodiment in FIG. 8A to FIG. 8D.

Alternatively, in a possible embodiment, the communication module 113 is configured to support the apparatus for controlling service flow transmission in performing the sending actions in step 708 and step 710 and the receiving action performed by the user plane network element step 725 in the foregoing embodiment in FIG. 9A to FIG. 9C. The processing module 112 is configured to support the apparatus for controlling service flow transmission in performing step 707 and step 726 in the foregoing embodiment in FIG. 9A to FIG. 9C.

The processing module 112 may be a processor or a controller, for example, may be a central processing unit, a general-purpose processor, a digital signal processor, an application-specific integrated circuit, a field programmable gate array or another programmable logic device, a transistor logic device, a hardware component, or any combination thereof. The processing module 112 may implement or execute logical blocks, modules, and circuits in various examples described with reference to content disclosed in this application. Alternatively, the processor may be a combination of processors implementing a computing function, for example, a combination of one or more microprocessors, or a combination of a digital signal processor and a microprocessor. The communication module 113 may be a transceiver, a transceiver circuit, a communication interface, or the like. The storage module 111 may be a memory.

When the processing module 112 is the processor 61 or the processor 65, the communication module 113 is the communication interface 63, and the storage module 111 is the memory 62, the apparatus for controlling service flow transmission in this embodiment of this application may be the communication device shown in FIG. 6.

For example, the apparatus for controlling service flow transmission is a session management network element, or is a chip used in the session management network element. In this case, the communication interface 63 is configured to support the apparatus for controlling service flow transmission in performing step 701 performed by the session management network element 10 in the foregoing embodiment in FIG. 7, FIG. 8A to FIG. 8D, or FIG. 9A to FIG. 9C, and support the apparatus for controlling service flow transmission in performing a sending action performed by the session management network element 10 in step 702 in the foregoing embodiment in FIG. 7, FIG. 8A to FIG. 8D, or FIG. 9A to FIG. 9C.

In a possible embodiment, the processor 61 or the processor 65 is further configured to support the apparatus for controlling service flow transmission in performing step 704 (for example, step 7041 and step 7042, step 7043, or step 7044) performed by the session management network element 10 in the foregoing embodiment in FIG. 8A to FIG. 8D. The communication interface 63 is further configured to support the apparatus for controlling service flow transmission in performing step 705 performed by the session management network element 10 in the foregoing embodiment in FIG. 8A to FIG. 8D. The communication interface 63 is further configured to support the apparatus for controlling service flow transmission in performing the sending actions performed by the session management network element 10 in step 706, step 716, step 718, step 721, step 724, and step 725 in the foregoing embodiment in FIG. 8A to FIG. 8D. Alternatively, the communication interface 63 is further configured to support the apparatus for controlling service flow transmission in performing the sending actions performed by the session management network element 10 in step 712, step 714, step 716, step 718, step 721, step 724, and step 725 in the foregoing embodiment in FIG. 9A to FIG. 9C. The processor 61 or the processor 65 is further configured to support the apparatus for controlling service flow transmission in performing step 723 in the foregoing embodiment in FIG. 8A to FIG. 8D or FIG. 9A to FIG. 9C.

For another example, the apparatus for controlling service flow transmission is a data plane network element, or is a chip used in the data plane network element. In this case, the communication interface 63 is configured to support the apparatus for controlling service flow transmission in performing the receiving action performed by the user plane network element in step 702 in the foregoing embodiment in FIG. 7. The processor 61 or the processor 65 is configured to support the apparatus for controlling service flow transmission in performing step 703 performed by the user plane network element in the foregoing embodiment in FIG. 7.

In a possible embodiment, the communication interface 63 is configured to support the apparatus for controlling service flow transmission in performing the receiving actions performed by the user plane network element in step 706 and step 725 in the foregoing embodiment in FIG. 8A to FIG. 8D. The processor 61 or the processor 65 is specifically configured to support the apparatus for controlling service flow transmission in performing step 7031 and step 7032 in the foregoing embodiment in FIG. 8A to FIG. 8D.

Alternatively, in a possible embodiment, the communication interface 63 is configured to support the apparatus for controlling service flow transmission in performing the sending actions in step 708 and step 710 and the receiving action performed by the user plane network element in step 725 in the foregoing embodiment in FIG. 9A to FIG. 9C. The processor 61 or the processor 65 is configured to support the apparatus for controlling service flow transmission in performing step 707 and step 726 in the foregoing embodiment in FIG. 9A to FIG. 9C.

Figure 14:
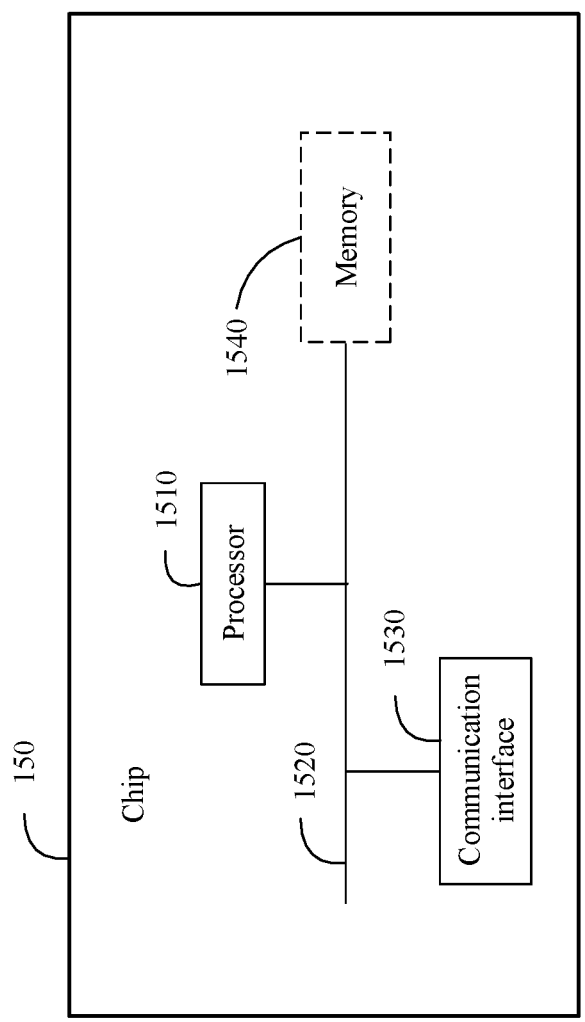
FIG. 14 is a schematic diagram of a structure of a chip according to an embodiment of this application.

FIG. 14 is a schematic diagram of a structure of a chip 150 according to an embodiment of this application. The chip 150 includes one or more (including two) processors 1510 and a communication interface 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, a subset thereof, or an extended set thereof.

In this embodiment of this application, a corresponding operation is performed by invoking the operation instructions (where the operation instructions may be stored in an operating system) stored in the memory 1540.

In a possible implementation, structures of chips used by a session management network element, a terminal, and a user plane network element are similar, and different apparatuses may implement respective functions by using different chips.

The processor 1510 controls a processing operation of any one of the session management network element, the terminal, or the user plane network element. The processor 1510 may also be referred to as a central processing unit (CPU).

The memory 1540 may include a read-only memory and a random access memory, and provide instructions and data for the processor 1510. A part of the memory 1540 may further include an NVRAM. For example, in an application, the memory 1540, the communication interface 1530, and the memory 1540 are coupled together by using a bus system 1520. The bus system 1520 may further include a power bus, a control bus, a status signal bus, and the like in addition to a data bus. However, for clear description, various types of buses in FIG. 14 are marked as the bus system 1520.

The methods disclosed in the foregoing embodiments of this application may be applied to the processor 1510, or may be implemented by the processor 1510. The processor 1510 may be an integrated circuit chip, and has a signal processing capability. In an implementation process, steps in the foregoing method may be implemented by using a hardware integrated logical circuit in the processor 1510, or by using instructions in a form of software. The processor 1510 may be a general-purpose processor, a digital signal processor (DSP), an ASIC, a field-programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing method in combination with hardware of the processor 1510.

In a possible implementation, the communication interface 1530 is configured to perform receiving and sending steps of the session management network element, the terminal, and the user plane network element in the embodiments shown in FIG. 7 to FIG. 9A to FIG. 9C. The processor 1510 is configured to perform processing steps of the session management network element, the terminal, and the user plane network element in the embodiments shown in FIG. 7 to FIG. 9A to FIG. 9C.

The communication unit may be a communication interface of the apparatus, and is configured to receive a signal from another apparatus. For example, when the apparatus is implemented as a chip, the communication unit is a communication interface used by the chip to receive a signal from another chip or apparatus or send a signal.

In addition, an embodiment of this application may provide a computer-readable storage medium. The computer-readable storage medium stores instructions. When the instructions are run, a function of the session management network element in FIG. 7, FIG. 8A to FIG. 8D, or FIG. 9A to FIG. 9C is implemented.

An embodiment of this application provides a computer-readable storage medium. The computer-readable storage medium stores instructions. When the instructions are run, a function of the user plane network element in FIG. 7, FIG. 8A to FIG. 8D, or FIG. 9A to FIG. 9C is implemented.

An embodiment of this application provides a computer program product including instructions. The computer program product includes the instructions. When the instructions are run, a function of the session management network element in FIG. 7, FIG. 8A to FIG. 8D, or FIG. 9A to FIG. 9C is implemented.

An embodiment of this application provides a computer program product including instructions. The computer program product includes the instructions. When the instructions are run, a function of the user plane network element in FIG. 7, FIG. 8A to FIG. 8D, or FIG. 9A to FIG. 9C is implemented.

An embodiment of this application provides a chip. The chip is used in a user plane network element. The chip includes at least one processor and a communication interface, the communication interface is coupled to the at least one processor, and the processor is configured to run instructions, to implement functions of the user plane network element in FIG. 7 to FIG. 9A to FIG. 9C.

An embodiment of this application provides a chip. The chip is used in a session management network element. The chip includes at least one processor and a communication interface, the communication interface is coupled to the at least one processor, and the processor is configured to run instructions, to implement functions of the session management network element in FIG. 7 to FIG. 9A to FIG. 9C.

An embodiment of this application provides a communication system. The communication system includes a session management network element and a user plane network element. The user plane network element is configured to perform steps performed by the user plane network element in FIG. 7 to FIG. 9A to FIG. 9C, and the session management network element is configured to perform steps performed by the session management network element in FIG. 7 to FIG. 9A to FIG. 9C.

All or some of the foregoing embodiments may be implemented by using software, hardware, firmware, or any combination thereof. When being implemented by using the software, all or some of embodiments may be implemented in a form of a computer program product. The computer program product includes one or more computer programs or instructions. When the computer programs or the instructions are loaded and executed on a computer, the procedures or functions in embodiments of this application are completely or partially generated. The computer may be a general-purpose computer, a special-purpose computer, a computer network, a network device, user equipment, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wireline or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (DVD), or may be a semiconductor medium such as a solid-state drive (solid state drive, SSD).

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A method for controlling service flow transmission, comprising:
obtaining, by a session management network element, a first total maximum bit rate (TMBR) of a service flow transmitted in a session by using a access technology and a guaranteed bandwidth of a first guaranteed bit rate (GBR) service flow, wherein the first TMBR indicates a maximum bandwidth value of service flows transmitted in the session by using the access technology;
sending, by the session management network element, first information to a data plane network element, wherein the first information is used to determine one or more of the following information: a first aggregate maximum bit rate (AMBR) of the session, a second AMBR corresponding to the access technology in the session, the first TMBR, or a second TMBR, wherein the second AMBR indicates a maximum aggregate bandwidth of a non-GBR service flow transmitted in the session by using the access technology, wherein the first AMBR indicates a maximum aggregate bandwidth of non-GBR service flows in the session, the second TMBR is a difference between the first TMBR and a total guaranteed bandwidth of one or more GBR service flows split on an uplink classifier corresponding to the access technology; and
sending, by the session management network element, indication information to the data plane network element, wherein the indication information indicates that when the GBR service flow transmitted in the session by using the access technology is in an inactive mode, the second AMBR is either the first AMBR or is a sum of a target second AMBR allocated to the non-GBR service flow and a guaranteed bandwidth value of the GBR service flow in the inactive mode.

2. The method according to claim 1, wherein the first information comprises one or more of the following information: the first AMBR, the second AMBR, or the second TMBR.

3. The method according to claim 1, wherein the method further comprises:
   determining, by the session management network element, at least one of the second AMBR or the second TMBR based on the first TMBR and the guaranteed bandwidth of the first GBR service flow.

4. The method according to claim 3, wherein the determining, by the session management network element, at least one of the second AMBR or the second TMBR based on the first TMBR and the guaranteed bandwidth of the first GBR service flow comprises:
   determining, by the session management network element based on the guaranteed bandwidth of the first GBR service flow, a total guaranteed bandwidth of one or more GBR service flows transmitted in the session by using the access technology; and
   determining, by the session management network element, the second AMBR based on the first TMBR and the total guaranteed bandwidth of the one or more GBR service flows.

5. The method according to claim 4, wherein the method further comprises:
   obtaining, by the session management network element, the first AMBR corresponding to the session, wherein the first AMBR indicates a maximum aggregate bandwidth of non-GBR service flows in the session; and
   the determining, by the session management network element, the second AMBR based on the first TMBR and the total guaranteed bandwidth of the one or more GBR service flows comprises:
   determining, by the session management network element, that the second AMBR is a difference between the first TMBR and the total guaranteed bandwidth of the one or more GBR service flows; and
   performing one of the following:
     when a difference between the first TMBR and the total guaranteed bandwidth of the one or more GBR service flows is greater than the first AMBR, determining, by the session management network element, that the second AMBR is the first AMBR; or
     when a difference between the first TMBR and the total guaranteed bandwidth of the one or more GBR service flows is less than the first AMBR, determining, by the session management network element, that the second AMBR is the difference between the first TMBR and the total guaranteed bandwidth of the one or more GBR service flows.

6. The method according to claim 3, wherein the determining, by the session management network element, at least one of the second AMBR or the second TMBR based on the first TMBR and the guaranteed bandwidth of the first GBR service flow comprises:
   determining, by the session management network element, the second TMBR based on the first TMBR and a total guaranteed bandwidth of the one or more GBR service flows split on an uplink classifier corresponding to the access technology.

7. The method according to claim 1, wherein the method further comprises:
   sending, by the session management network element to an access network gateway corresponding to the access technology, an identifier of the session and one or more of the following information: the second AMBR or the first TMBR.

8. The method according to claim 1, wherein the method further comprises:
   sending, by the session management network element, the second AMBR or the first TMBR of the session to an uplink classifier corresponding to the access technology.

9. The method according to claim 1, wherein the first information comprises one or more of the following information: the first TMBR, the second TMBR, or a guaranteed bandwidth of each GBR service flow in one or more GBR service flows transmitted in the session by using the first access technology.

10. The method according to claim 1, wherein
    when the sum of the target second AMBR and the guaranteed bandwidth value of the GBR service flow in the inactive mode is less than the first AMBR, the second AMBR is the sum of the target second AMBR and the guaranteed bandwidth value of the GBR service flow in the inactive mode; or
    when the sum of the target second AMBR and the guaranteed bandwidth value of the GBR service flow in the inactive mode is greater than or equal to the first AMBR, the second AMBR is the first AMBR.

11. The method according to claim 1, wherein the method further comprises:
    controlling, by the data plane network element based on at least one of the second AMBR, the first TMBR, or the second TMBR, the service flow transmitted in the session by using the access technology.

12. A communication apparatus, comprising:
    at least one processor; and
    one or more memories coupled to the at least one processor and storing programming instructions for execution by the at least one processor to cause the apparatus to:
    obtain a first total maximum bit rate (TMBR) of a service flow transmitted in a session by using a access technology and a guaranteed bandwidth of a first guaranteed bit rate (GBR) service flow, wherein the TMBR indicates a maximum bandwidth value of service flows transmitted in the session by using the access technology;
    send first information to a data plane network element, wherein the first information is used to determine one or more of the following information: a first aggregate maximum bit rate (AMBR) of the session, a second AMBR corresponding to the access technology in the session, the first TMBR, or a second TMBR, wherein the second AMBR indicates a maximum aggregate bandwidth of a non-GBR service flow transmitted in the session by using the access technology, wherein the first AMBR indicates a maximum aggregate bandwidth of non-GBR service flows in the session, the second TMBR is a difference between the first TMBR and a total guaranteed bandwidth of one or more GBR service flows split on an uplink classifier corresponding to the access technology; and
    send indication information to the data plane network element, wherein the indication information indicates that when the GBR service flow transmitted in the session by using the access technology is in an inactive mode, the second AMBR is either the first AMBR or is a sum of a target second AMBR allocated to the non-GBR service flow and a guaranteed bandwidth value of the GBR service flow in the inactive mode.

13. The communication apparatus according to claim 12, wherein the first information comprises one or more of the following information: the first AMBR, the second AMBR, or the second TMBR.

14. The communication apparatus according to claim 12, wherein the programming instructions, when executed by the at least one processor, cause the apparatus to:
determine at least one of the second AMBR or the second TMBR based on the first TMBR and the guaranteed bandwidth of the first GBR service flow.

15. The communication apparatus according to claim 14, wherein the programming instructions, when executed by the at least one processor, cause the apparatus to:
determine, based on the guaranteed bandwidth of the first GBR service flow, a total guaranteed bandwidth of one or more GBR service flows transmitted in the session by using the access technology; and
determine the second AMBR based on the first TMBR and the total guaranteed bandwidth of the one or more GBR service flows.

16. The communication apparatus according to claim 14, wherein the programming instructions, when executed by the at least one processor, cause the apparatus to:
determine the second TMBR based on the first TMBR and a total guaranteed bandwidth of the one or more GBR service flows split on an uplink classifier corresponding to the access technology.

17. The communication apparatus according to claim 12, wherein the programming instructions, when executed by the at least one processor, cause the apparatus to:
send, to an access network gateway corresponding to the access technology, an identifier of the session and one or more of the following information: the second AMBR or the first TMBR.

18. The communication apparatus according to claim 12, wherein the programming instructions, when executed by the at least one processor, cause the apparatus to:
send the second AMBR or the first TMBR of the session to an uplink classifier corresponding to the access technology.

19. A communication system, comprising:
a session management network element, comprising:
at least one first processor; and one or more first memories coupled to the at least one first processor and storing first programming instructions for execution by the at least one first processor to cause the session management network element to:
obtain a first total maximum bit rate (TMBR) of a service flow transmitted in a session by using a access technology and a guaranteed bandwidth of a first guaranteed bit rate (GBR) service flow, wherein the TMBR indicates a maximum bandwidth value of service flows transmitted in the session by using the first access technology;
send first information to a data plane network element, wherein the first information is used to determine one or more of the following information: a first aggregate maximum bit rate (AMBR) of the session, a second AMBR corresponding to the access technology in the session, the first TMBR, or a second TMBR, wherein the second AMBR indicates a maximum aggregate bandwidth of a non-GBR service flow transmitted in the session by using the access technology, wherein the first AMBR indicates a maximum aggregate bandwidth of non-GBR service flows in the session, the second TMBR is a difference between the first TMBR and a total guaranteed bandwidth of one or more GBR service flows split on an uplink classifier corresponding to the access technology; and
send indication information to the data plane network element, wherein the indication information indicates that when the GBR service flow transmitted in the session by using the access technology is in an inactive mode, the second AMBR is either the first AMBR or is a sum of a target second AMBR allocated to the non-GBR service flow and a guaranteed bandwidth value of the GBR service flow in the inactive mode; and
the data plane network element, comprising:
at least one second processor; and one or more second memories coupled to the at least one second processor and storing second programming instructions for execution by the at least one second processor to cause the data plane network element to:
control, based on at least one of the second AMBR, the first TMBR, or the second TMBR, the service flow transmitted in the session by using the access technology.

\* \* \* \* \*

UNITED STATES PATENT AND TRADEMARK OFFICE
CERTIFICATE OF CORRECTION

PATENT NO. : 12,200,533 B2  
APPLICATION NO. : 17/706274  
DATED : January 14, 2025  
INVENTOR(S) : Youyang Yu Page 1 of 1

It is certified that error appears in the above-identified patent and that said Letters Patent is hereby corrected as shown below:

In the Claims

In Column 50, In Line 15 (Approx.), In Claim 9, after "using the" delete "first".

In Column 52, In Line 10 (Approx.), In Claim 19, before "access" delete "first".

Signed and Sealed this
Twenty-second Day of April, 2025

Coke Morgan Stewart
*Acting Director of the United States Patent and Trademark Office*